(12) United States Patent
Ukai

(10) Patent No.: US 6,920,549 B1
(45) Date of Patent: Jul. 19, 2005

(54) BRANCH HISTORY INFORMATION WRITING DELAY USING COUNTER TO AVOID CONFLICT WITH INSTRUCTION FETCHING

(75) Inventor: Masaki Ukai, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,275

(22) Filed: Mar. 21, 2000

(30) Foreign Application Priority Data

Sep. 30, 1999 (JP) .................................. 11-277816

(51) Int. Cl.$^7$ ............................................ G06F 9/38
(52) U.S. Cl. ...................... 712/219; 712/207; 712/238; 712/240
(58) Field of Search ............................... 712/207, 219, 712/240, 238

(56) References Cited

U.S. PATENT DOCUMENTS

| | | | |
|---|---|---|---|
| 4,984,154 A | 1/1991 | Hanatani et al. ............ | 712/240 |
| 5,434,985 A | 7/1995 | Emma et al. ................ | 712/240 |
| 5,740,415 A | 4/1998 | Hara .......................... | 712/238 |
| 5,758,143 A | 5/1998 | Levitan ....................... | 712/240 |
| 5,875,324 A * | 2/1999 | Tran et al. ................... | 712/238 |
| 5,974,543 A * | 10/1999 | Hilgendorf et al. .......... | 712/240 |

FOREIGN PATENT DOCUMENTS

| | | |
|---|---|---|
| JP | 59-91554 | 5/1984 |
| JP | 6-110684 | 4/1994 |
| JP | 8-110857 | 4/1996 |
| JP | 10-171652 | 6/1998 |

* cited by examiner

Primary Examiner—Kenneth S. Kim
(74) Attorney, Agent, or Firm—Staas & Halsey LLP

(57) ABSTRACT

A branch history information write control device in an instruction execution processing apparatus includes a memory unit storing an instruction string, and a branch prediction unit performing a branch prediction of a branch instruction. A control unit in the device controls the memory unit and the branch prediction unit in such a way that writing of branch history information in the branch prediction unit and control over fetching of the instruction string in the memory unit may not occur simultaneously so that no instruction fetch is held. A bypass unit in the device makes the branch history information of the branch instruction a research target of a branch prediction, where said control unit uses a counter to count several clock cycles (several states) to delay, for a period of several clock cycles (several states), the writing of the branch history information and control, beforehand, the fetching of the instruction string.

45 Claims, 32 Drawing Sheets

EXAMPLE OF SHORT LOOP

```
┌──▶ LOOP:L    1, 0(1, 15)
│
│       ST    2, 4(1, 15)
│
└─────  BCT   4, LOOP

NOP...
```

FIG. 2A Prior Art

| BC | U | W | | | |
|---|---|---|---|---|---|
| NOP1 | IA | IT | IB | IR | D |
| NOP2 | | | | | D |
| NOP3 | | | | | D |
| NOP4 | | | | | | D |
| NOP5 | | IA | IT | IB | IR | D |
| NOP6 | | | | | | D |
| NOP7 | | | | | | | D |
| NOP8 | | | | | | | D |

IMPROVEMENT OF AVERAGE 1 CLOCK CYCLE

F I G. 3

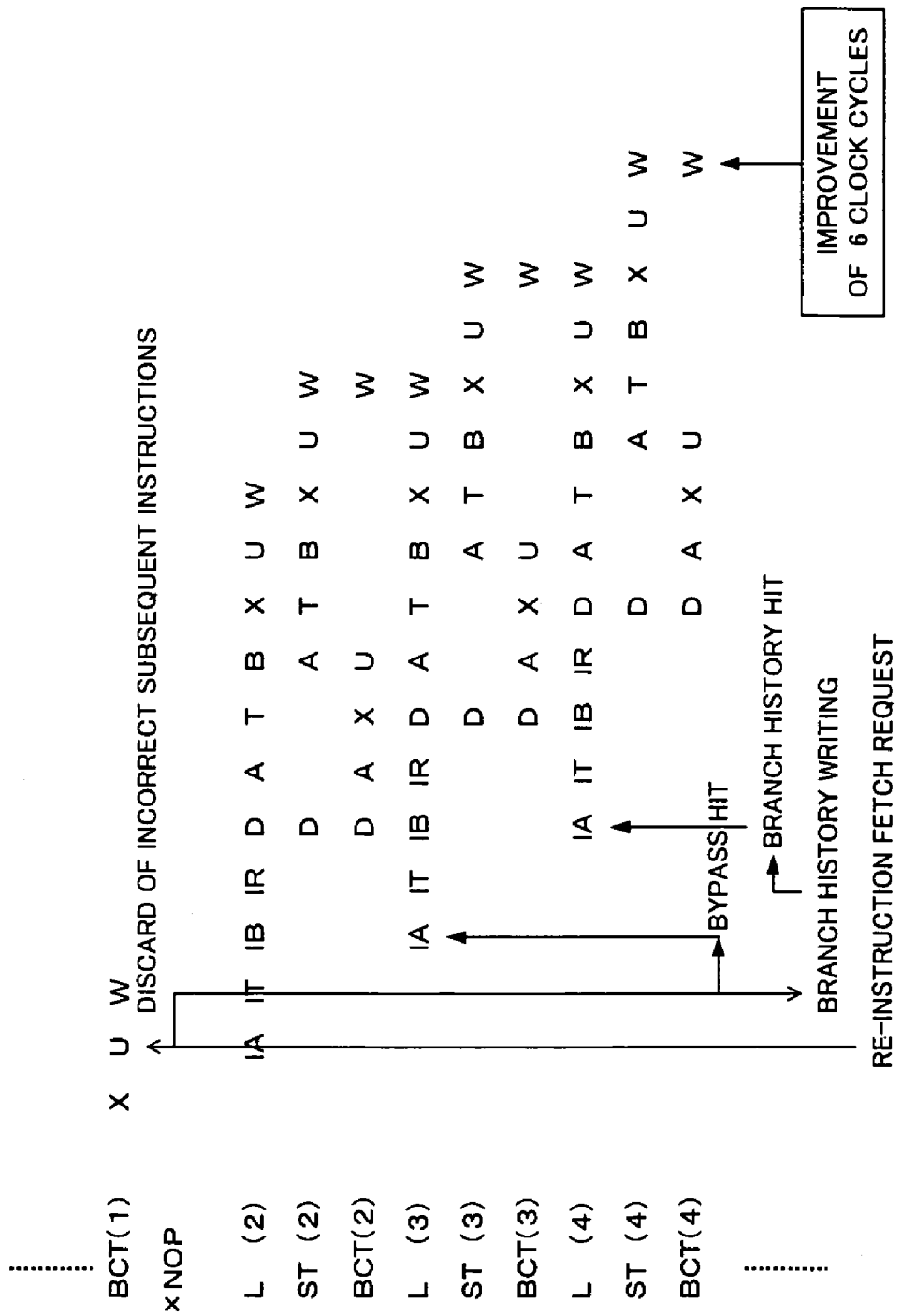

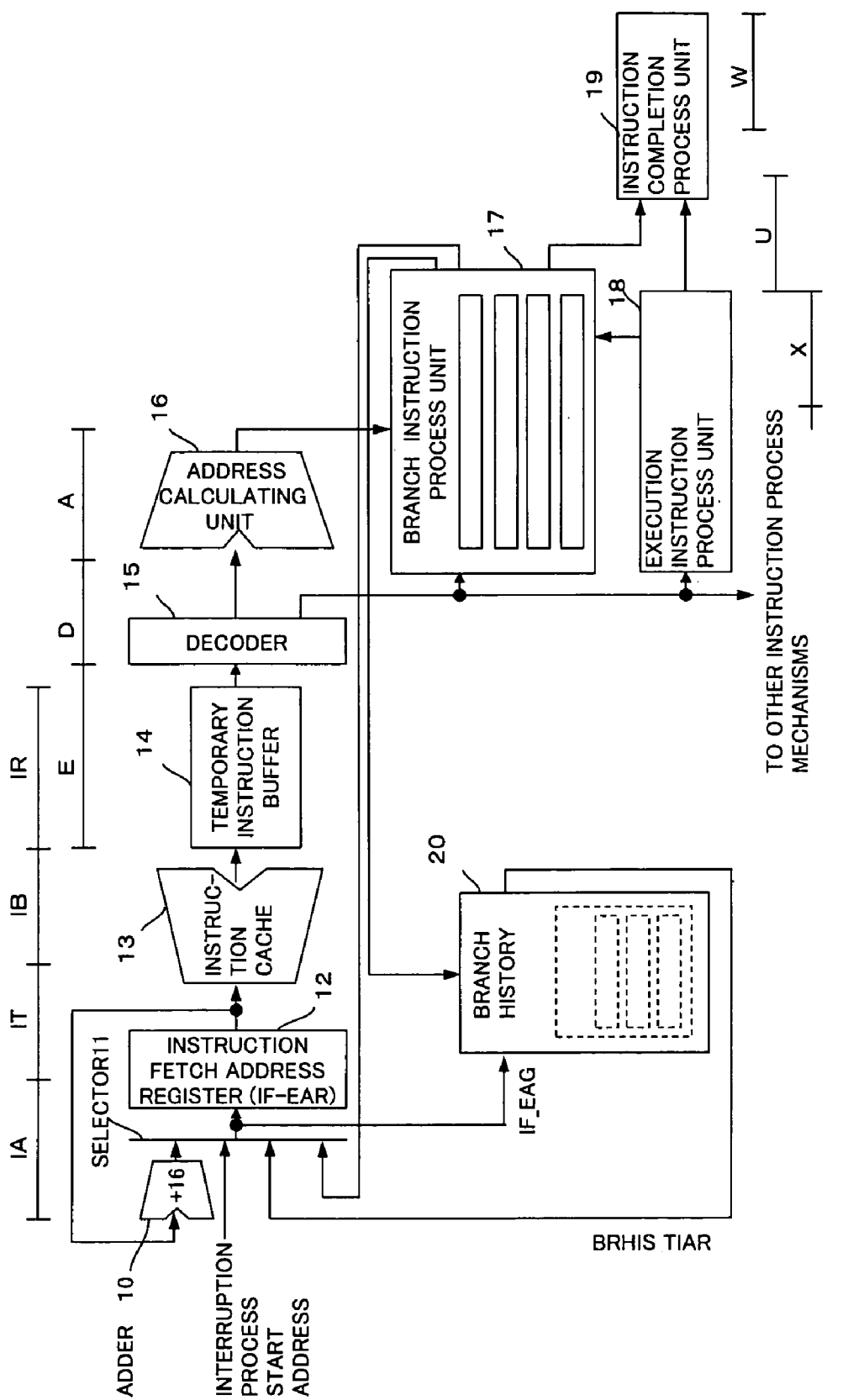
F I G. 5

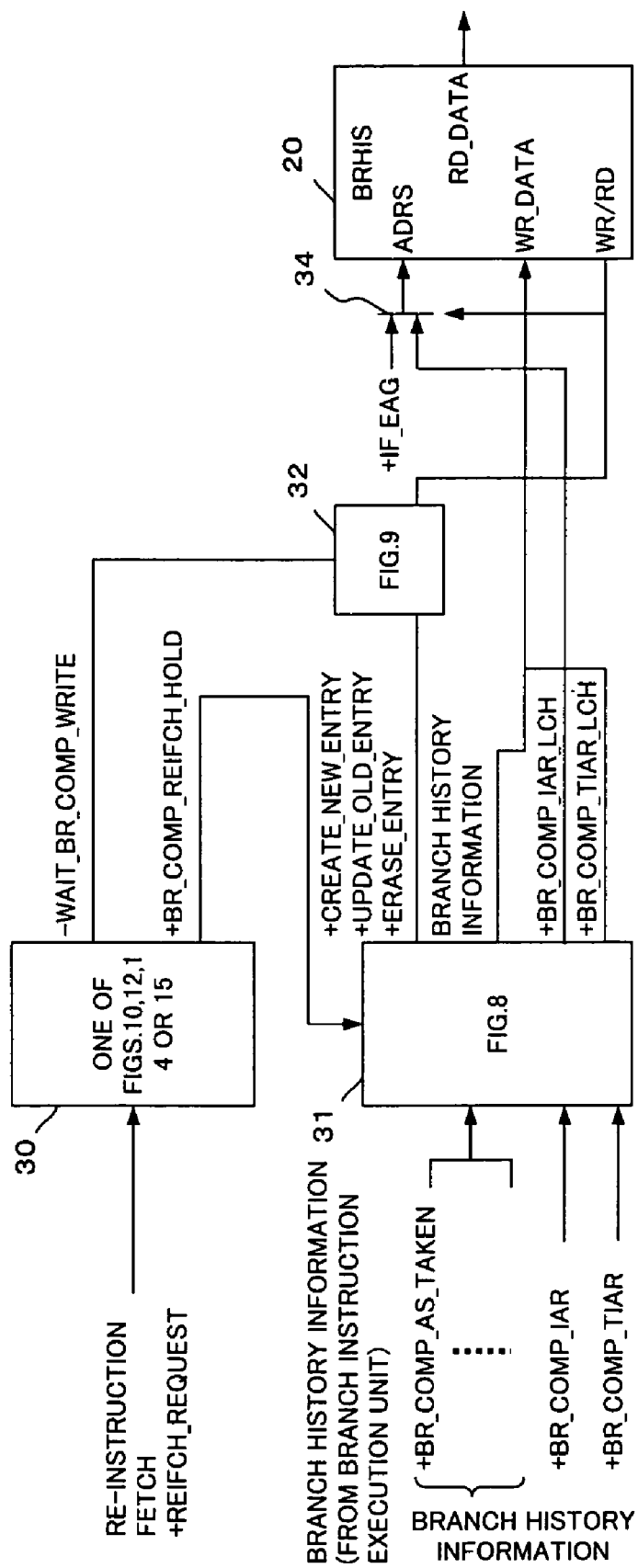
F I G. 7

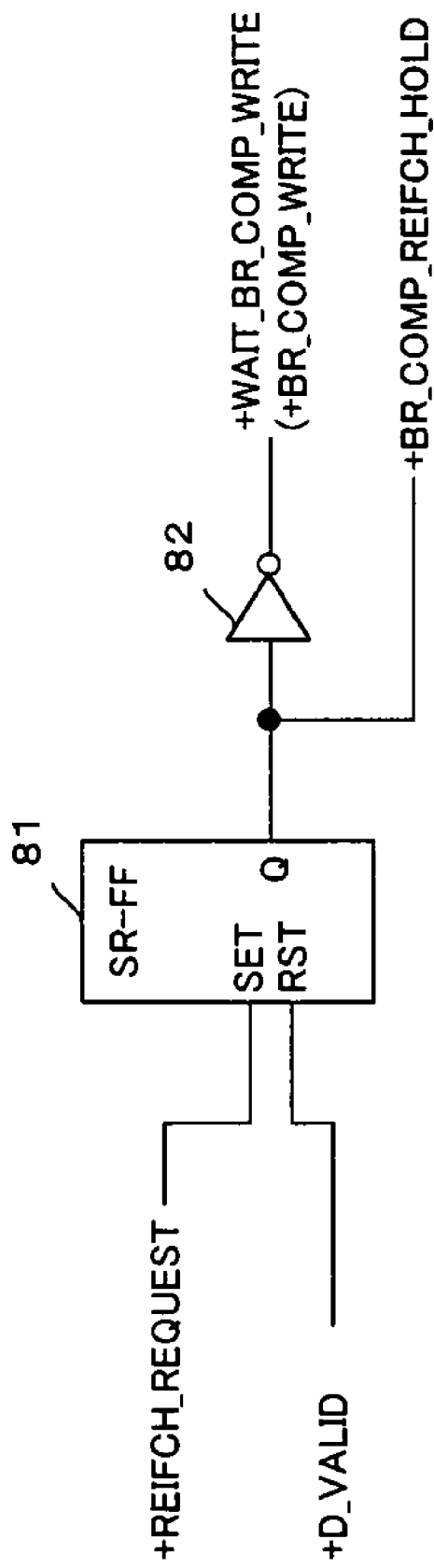
F I G. 12

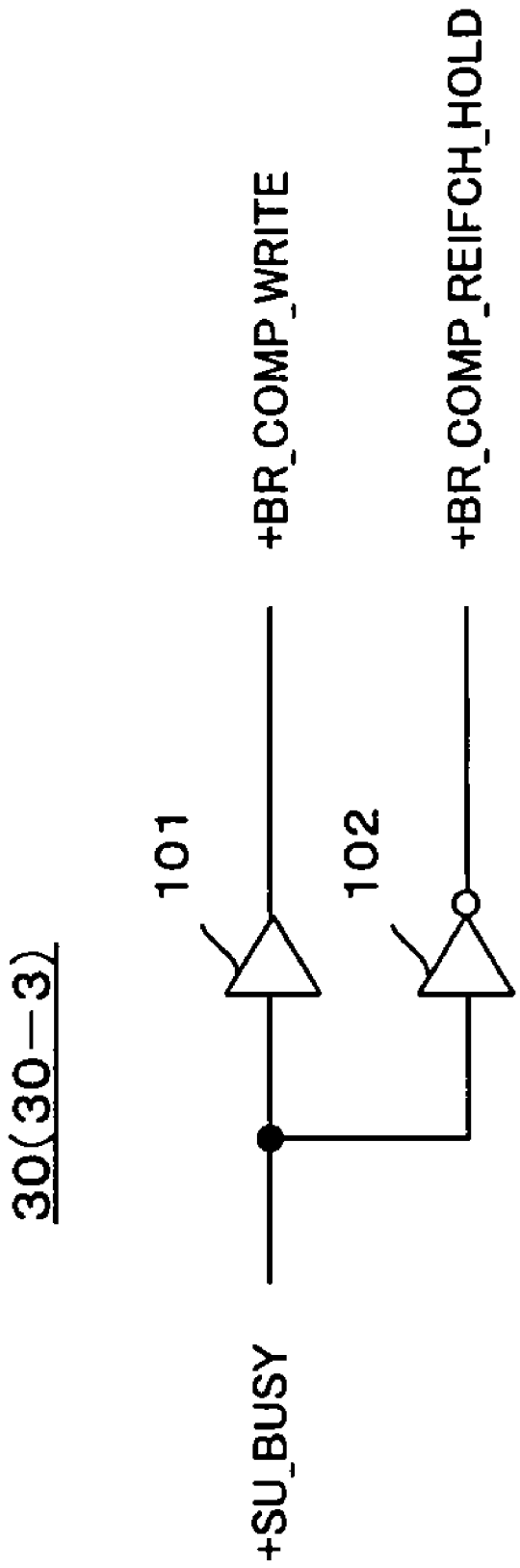
F I G. 14

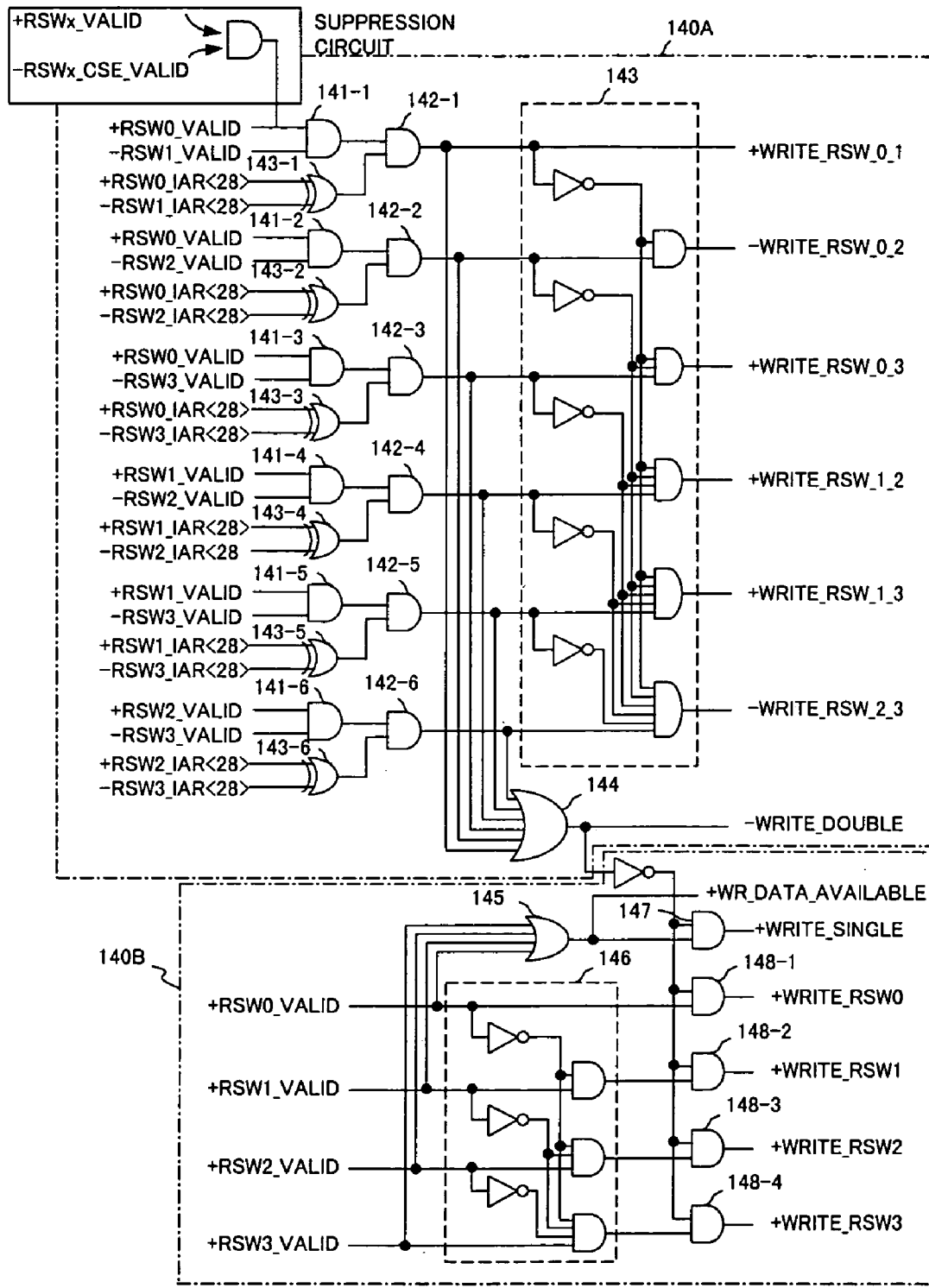
F I G. 1 8

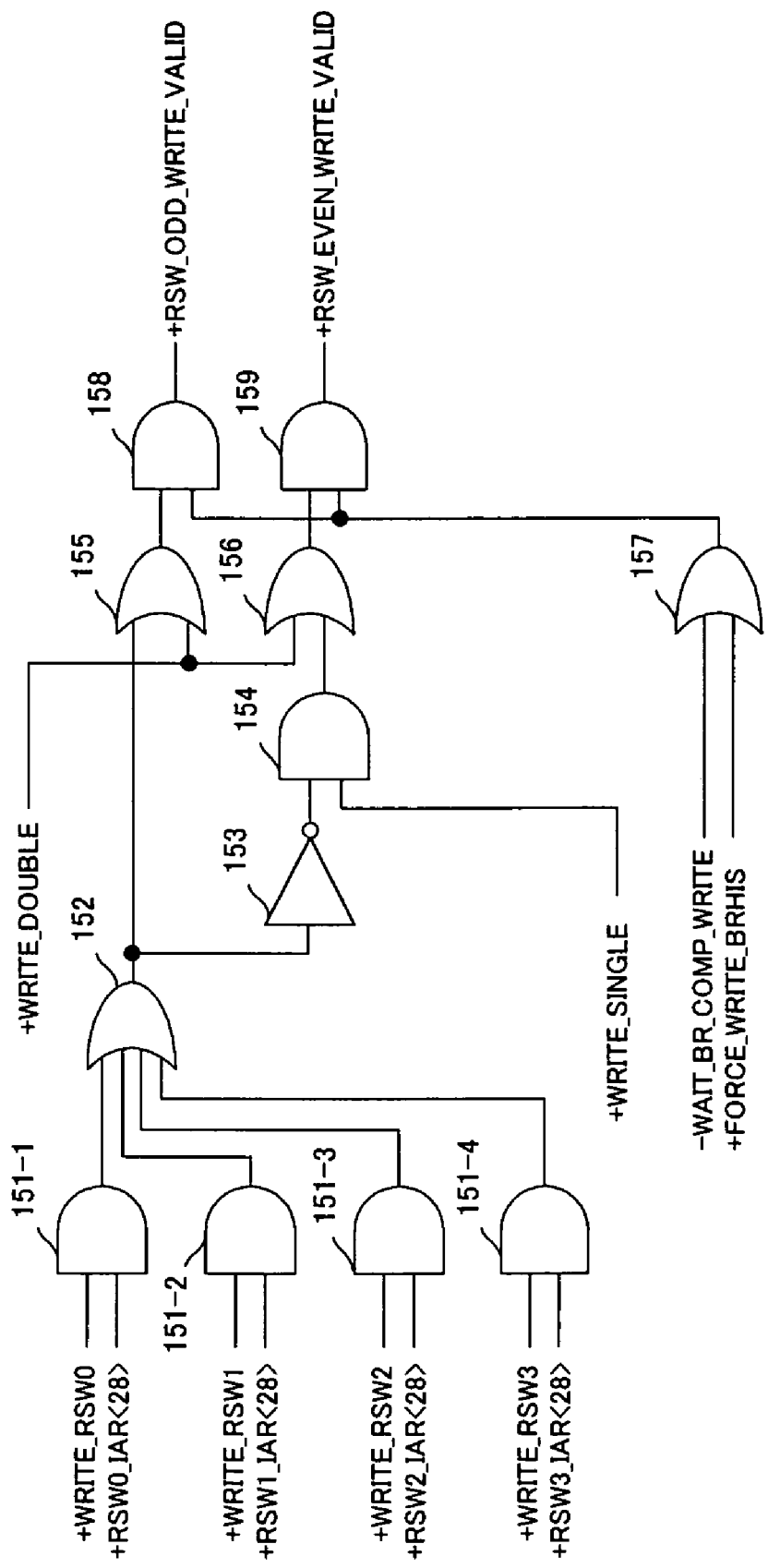
F I G. 19

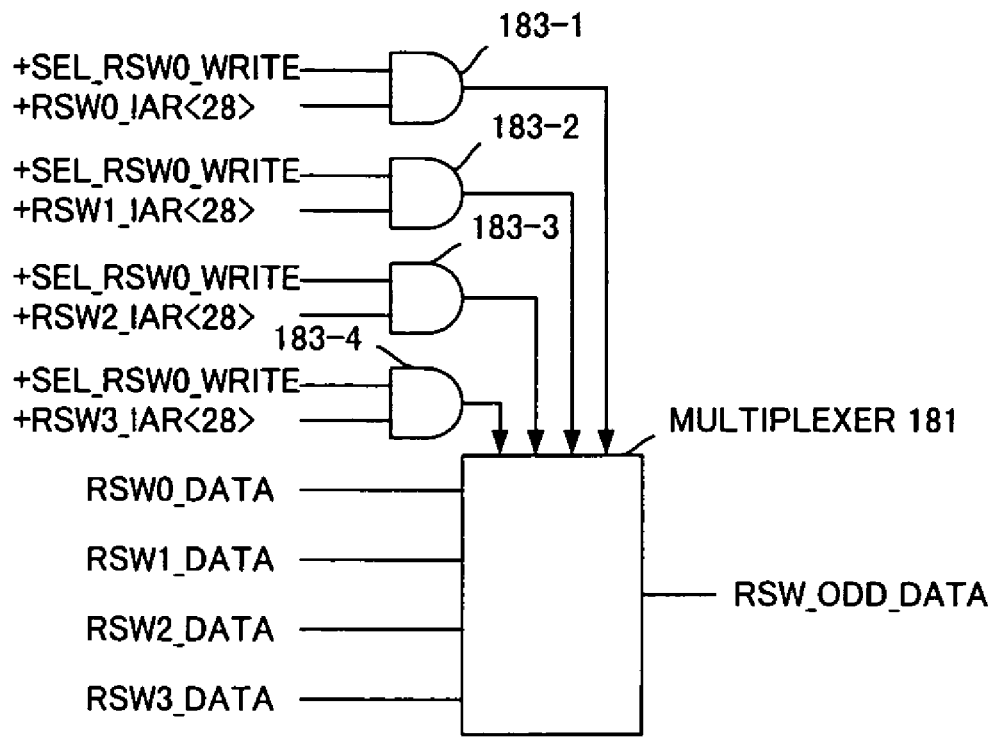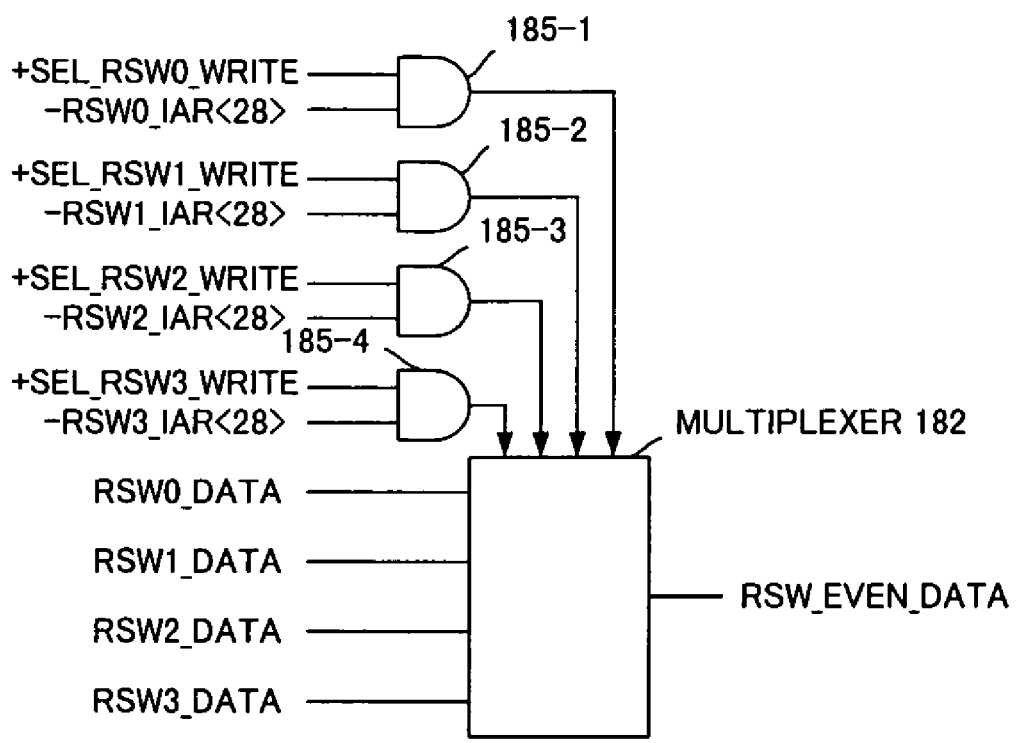
FIG. 21

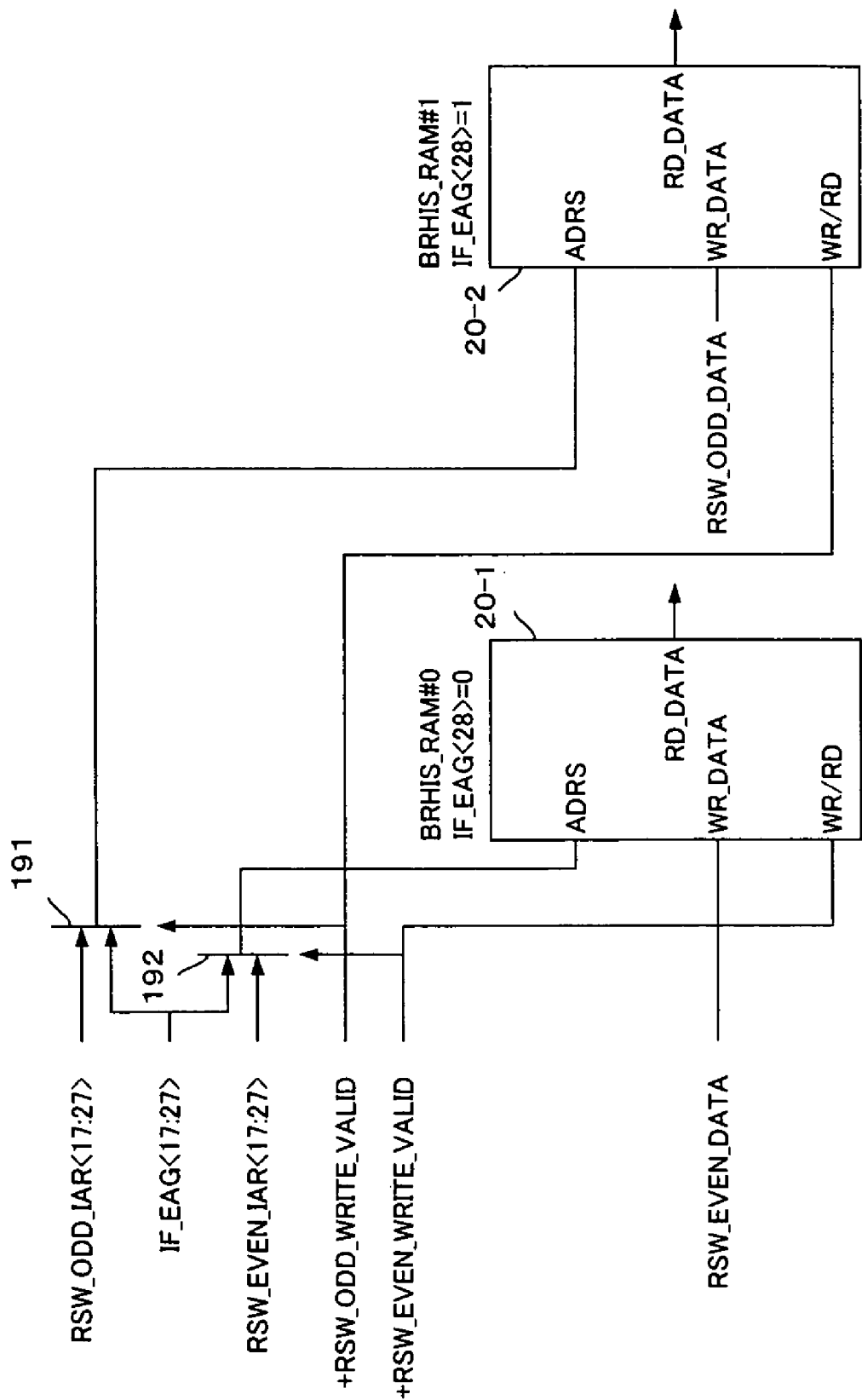

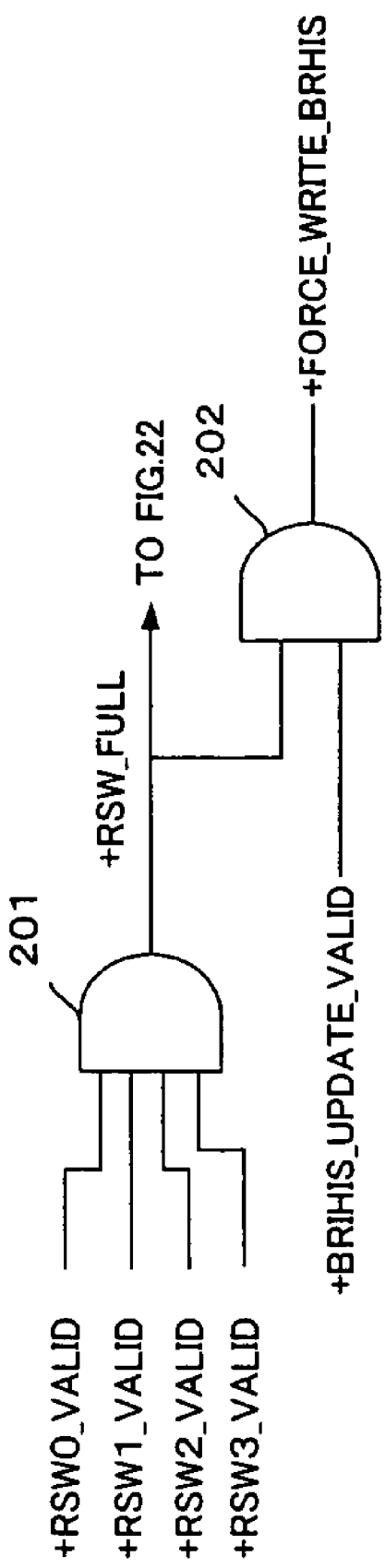
F I G. 2 3

| RSW 0 | RSW 1 | RSW 2 | RSW 3 |
|---|---|---|---|
| Valid | Valid | Valid | Valid |
| IAR | IAR | IAR | IAR |
| CSE-Valid | CSE-Valid | CSE-Valid | CSE-Valid |
| IID | IID | IID | IID |
| BRANCH HISTORY INFORMATION | BRANCH HISTORY INFORMATION | BRANCH HISTORY INFORMATION | BRANCH HISTORY INFORMATION |

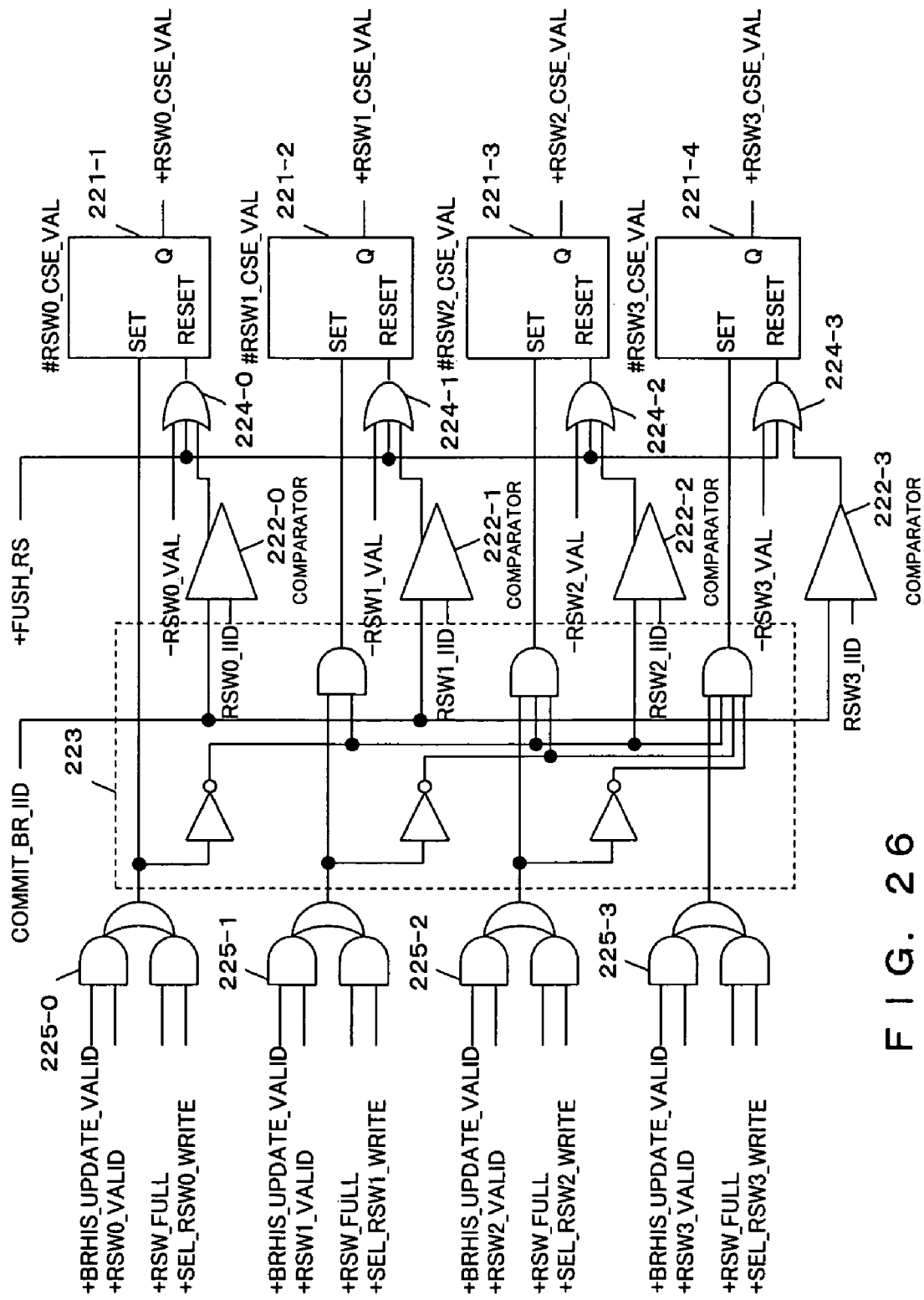
F I G. 26

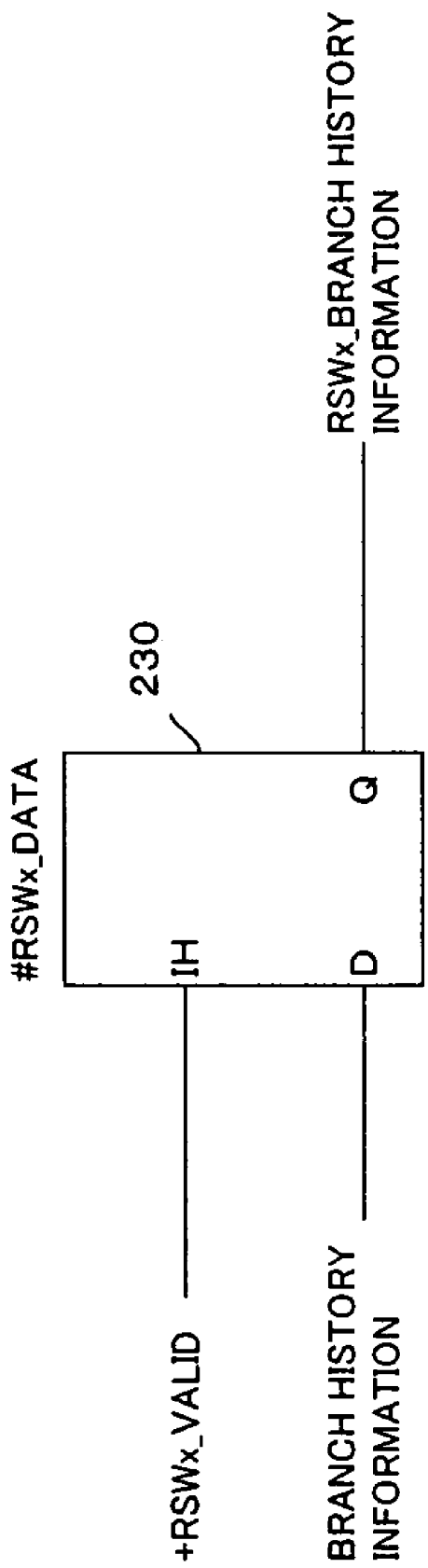
F I G. 27

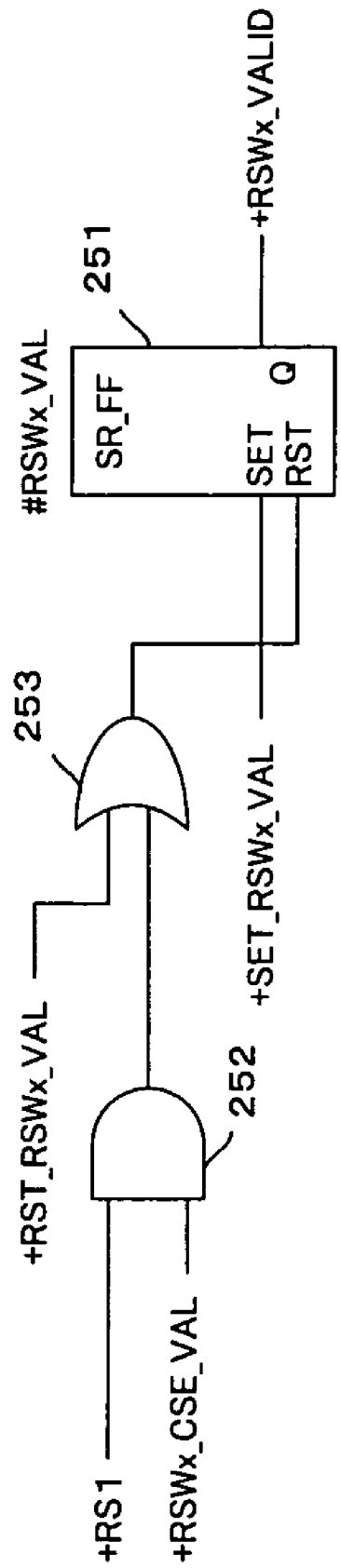
F I G. 29

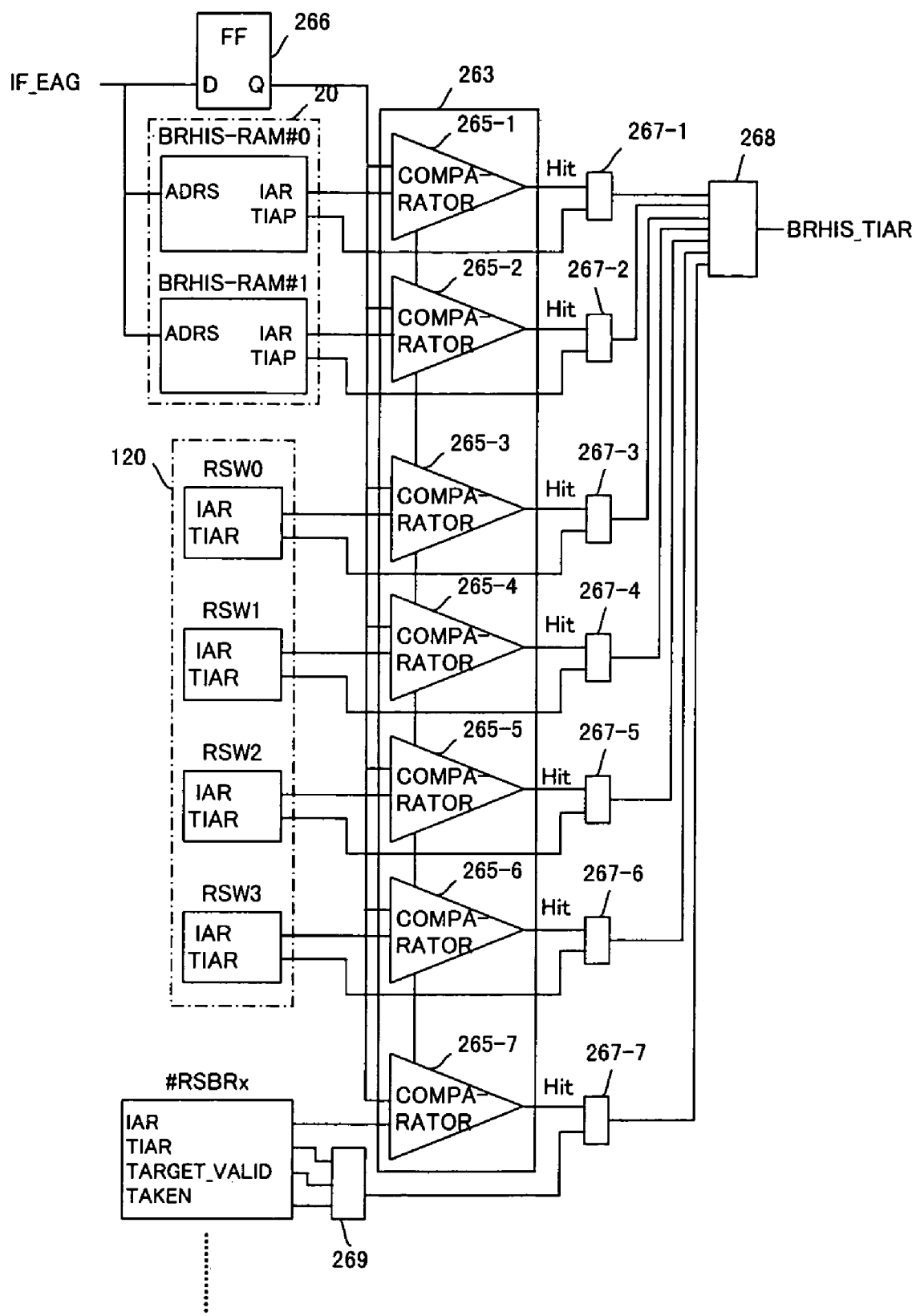
F I G. 30

BRANCH HISTORY INFORMATION WRITING DELAY USING COUNTER TO AVOID CONFLICT WITH INSTRUCTION FETCHING

BACKGROUND OF THE INVENTION

1. Field of the Invention

The present invention relates to a device for controlling the writing of branch history information in an information processing apparatus provided with a branch estimation unit.

2. Description of the Related Art

In an instruction execution processing apparatus, performance is improved by using technologies including a pipeline process and sequentially starting the execution of subsequent instructions without waiting for the completion of a specific instruction. In this case, if a previous instruction is an instruction to change the execution sequence of a subsequent execution, such as a branch instruction, etc., and a branch is established, the execution pipeline is impeded, and in the worst case, the performance is degraded if an instruction on the branch destination is not inputted to the execution pipeline. Under these circumstances, a branch prediction unit represented by a branch history is provided and the establishment of a branch is predicted. If a branch establishment is predicted, the performance could be improved by inputting an instruction on the branch destination following a branch instruction to an execution control unit or instruction process unit.

However, in a conventional branch prediction unit, the branch history information of a branch instruction of which the execution is completed in a branch control unit was registered in a branch history by temporarily stopping the instruction fetch.

According to this system, in particular, if a branch prediction fails and a correct subsequent instruction is re-executed, and specifically, if a re-instruction fetch occurs, an instruction fetch pipeline is temporarily stopped by the branch history information writing the completed branch instruction into the branch history although the frequency of a fetch request is high since a temporary instruction buffer is empty. Accordingly, the performance was not improved.

Specifically, although, as in the execution of a branch instruction BC shown in FIG. 1, in the cycle W of the execution cycle of a branch instruction, the branch history information is written into the branch history, only one access can be allowed at one time since the branch history is comprised of RAMs (random access memory). Accordingly, the re-instruction fetch of the branch destination instruction is started one clock cycle behind the cycle W of the branch instruction.

The branch history information is to be written in the branch history when it can be completed in the branch control unit, and is not written at the time of actual branch execution completion. Accordingly, if an interruption occurs immediately before the branch execution, a return address stack is sometimes operated by mistake.

If there is a short loop, especially in an instruction string as shown in FIG. 2A, this instruction string can be fetched at one instruction fetch. Therefore, the timing becomes as shown in FIG. 2B, and the branch history information is written later than the re-instruction fetch. If there is a branch instruction to be looped immediately after the re-instruction fetch, etc., a correct branch cannot be predicted. In this case, since one more re-instruction fetch is executed, the performance is degraded.

SUMMARY OF THE INVENTION

An objective of the present invention is to provide an instruction execution control device for suppressing a process delay in an information processing apparatus provided with a branch prediction unit, and a method thereof.

A device in the first aspect of the present invention comprises a control unit controlling in such a way that the writing of branch history information into a branch prediction unit and the control over the memory unit may not occur simultaneously in a branch history information write control device in an instruction execution processing apparatus provided with a memory unit storing an instruction string, etc., and a branch prediction unit performing the branch prediction of a branch instruction.

In a branch history information write control device of an instruction execution processing apparatus provided with a branch prediction unit performing the branch prediction of a branch instruction, a device in the second aspect of the present invention comprises a return address stack unit and a control unit controlling in such a way that if the branch instruction is not executed although the branch instruction is an instruction corresponding to a sub-routine call or return, and the write request of the branch history information of the branch instruction is issued to the branch prediction unit, the branch history information is written in the branch prediction unit, but the return address stack unit may not be operated.

A method in the first aspect of the present invention is an instruction control method in an apparatus provided with a memory storing an instruction string, etc., and a branch prediction unit performing the branch prediction of a branch instruction, and comprises the step of controlling in such a way that the writing of branch history information in the branch prediction unit and the control over the memory may not occur simultaneously.

A method in the second aspect of the present invention is an instruction control method in an apparatus provided with a branch prediction unit performing the branch prediction of a branch instruction and a return address stack, and comprises the step of controlling in such a way that if the branch instruction is not executed although an instruction corresponding to the sub-routine call or return obtained as an execution result of the branch instruction issues the write request on the branch history information to the branch prediction unit, the branch history information is written in the branch prediction unit, but the return address stack is not operated.

Although conventionally an instruction fetch is held and branch history information is written in the branch prediction unit (branch history), according to the present invention, an instruction fetch is not held and the branch history is written in a branch history in a timing such that the writing of the branch history information in the branch history and the control of the instruction fetch, etc., over a memory may not occur simultaneously. Accordingly, no instruction fetch is held and thereby the execution process speed can be improved.

BRIEF DESCRIPTIONS OF THE DRAWINGS

FIGS. 2A and 2B show conventional problems occurring when a short loop is formed between branch instructions.

FIG. 3 shows effects obtained when a branch instruction is executed according to the present invention.

FIGS. 4A and 4B show effects obtained when a short loop is formed between branch instructions according to the present invention.

FIG. 5 shows the basic configuration of the preferred embodiments of the present invention.

FIG. 7 shows an example basic configuration for delaying the writing of the branch history information of a branch instruction re-instruction-fetched.

FIG. 12 shows another preferred embodiment of a circuit corresponding to a box 30 shown in FIG. 7.

FIG. 14 shows another preferred embodiment of a circuit of a box 30 shown in FIG. 7 (No. 1).

FIG. 18 shows a selection circuit for plurally and simultaneously writing in a branch history (No. 1).

FIG. 19 shows a selection circuit for plurally and simultaneously writing in a branch history (No. 2).

FIG. 21 shows a selection circuit for plurally and simultaneously writing in a branch history (No. 4).

FIG. 22 shows a circuit for plurally and simultaneously writing in a branch history.

FIG. 23 shows an example circuit configuration of a circuit for compulsorily writing in a branch history.

FIG. 25 shows an example configuration of a reservation station in the case where writing in a reservation station is available after the completion of an instruction execution under IID (Instruction ID) control.

FIG. 26 shows an example configuration of the CSE valid circuit of a write reservation station.

FIG. 27 shows the data storage configuration of a write reservation station.

FIG. 29 shows an example circuit for nullifying the entry of a reservation station if an instruction execution is temporarily stopped due to an interruption, etc.

FIG. 30 shows one preferred embodiment of a bypass hit circuit.

DESCRIPTION OF THE PREFERRED EMBODIMENTS

In the preferred embodiment of the present invention, the writing of branch history information is held while a branch history is being looked up, and the branch history information is written in a cycle which does not look up the branch history. If this method is used, any impediment of an instruction fetch disappears. Accordingly, a pipeline process can be smoothly performed and thereby the degradation of the performance described earlier can be prevented.

Figure 1:
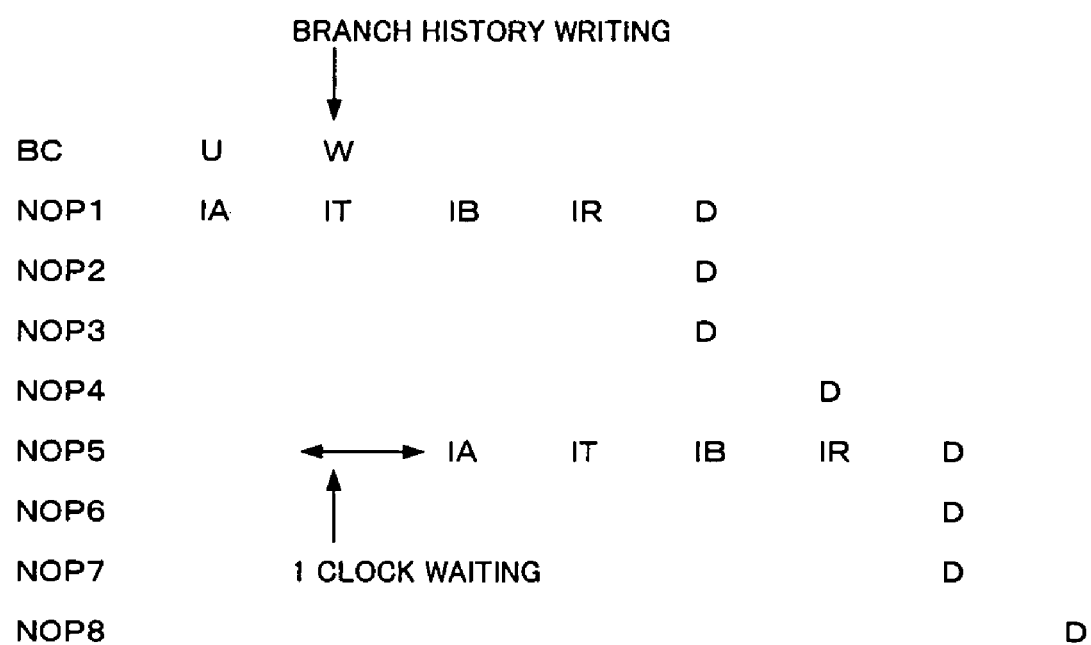
FIG. 1 shows conventional problems occurring at the time of execution of a branch instruction.

Specifically, as shown in FIG. 3, if an instruction string shown in FIG. 1 is executed, in this preferred embodiment, an instruction fetch of NOP5, which was conventionally started following the cycle W of a branch instruction BC, can be started in the same cycle as the cycle W of the branch instruction BC. Accordingly, by adopting this preferred embodiment, the performance can be improved by one clock cycle on average.

While the density of an instruction fetch is high immediately after a re-instruction fetch, writing into a branch history is held. In particular, since a new branch instruction is executed and completed for several clock cycles immediately after a re-instruction fetch, most of performance degradation can be prevented in a small-scale circuit without providing a reservation station described next.

The preferred embodiment of the present invention provides a method for realizing a temporary buffer in order to hold the writing of branch history information. If instruction fetch requests continue, and, even if an instruction pipeline process is very smoothly executed, the impediment of an instruction fetch request can be eliminated by providing a reservation station as a holding device for realizing such a buffer function. Accordingly, the performance degradation can be prevented.

If there is a new write request while branch history information is being held by the holding device, a control method for preventing a reservation station which becomes a temporary buffer, from overflowing is provided. According to such a preferred embodiment, all branch history information can be registered/updated in a branch history without failure.

Depending on the configuration of a branch history, a plurality of branch histories can be simultaneously written in the same cycle. In a branch history comprised of a plurality of RAMs (random access memory) which can store another entry, a maximum of the same number of different entries as RAMs composing the branch history can be written. It is clear that by doing so, a lot of history information of branch instructions can be written in a branch history while the impediment of writing for branch prediction is reduced.

Branch history information is reported before a branch instruction is completed. Generally speaking, in an instruction execution control device adopting a system, such as an out-of-order, etc., the branch instruction is sometimes held because the previous instruction is not completed yet although all conditions for executing a specific instruction are met. In particular, in this case, after the uncompleted instruction meets all conditions, instructions which have been held are collectively attempted to be completed. Accordingly, by adopting such a method, the load of writing in the branch history can be dispersed.

If in the case of a branch prediction unit provided with a return address stack, the return address stack is operated when the branch history information of a branch instruction which has not actually been executed is reported, the correspondences between pairs of subsequent sub-routine calls and returns naturally collapse, and the prediction of the branch destination address of a sub-routine return instruction fails. Therefore, the return address stack is configured not to be operated by the call/return instruction mistakenly being executed as long as the return address stack is actually executed, although the branch instruction is registered in a branch history.

The registration/update of the branch history information is held until an instruction execution is completed. In this case, the branch history information can be written simultaneously with the execution completion or the writing can be held until there is a favorable timing. In this case, alternatively, a method for identifying an instruction with an ID number assigned for each instruction can be used to judge whether the execution of the branch instruction is completed. If the execution of the branch instruction is cancelled although the branch history information is transmitted, the relevant entry corresponding to the write reservation station can also be nullified. In this case, since the history information of a branch that has been executed with certainty is to be used if the writing is held until the execution is completed, no incorrect branch history information is registered and thereby the accuracy of a branch prediction is improved.

If a branch prediction is performed by a branch prediction unit, branch history information, writing of which is held, etc., can also be used by bypassing the writing. In this case, since bypassing was performed, the latest branch history information can be used, and an enhanced effect can be obtained, in particular in a local loop. Specifically, the process delay of a pipeline can be improved by approximately several clock cycles for each short loop.

Figure 2B:
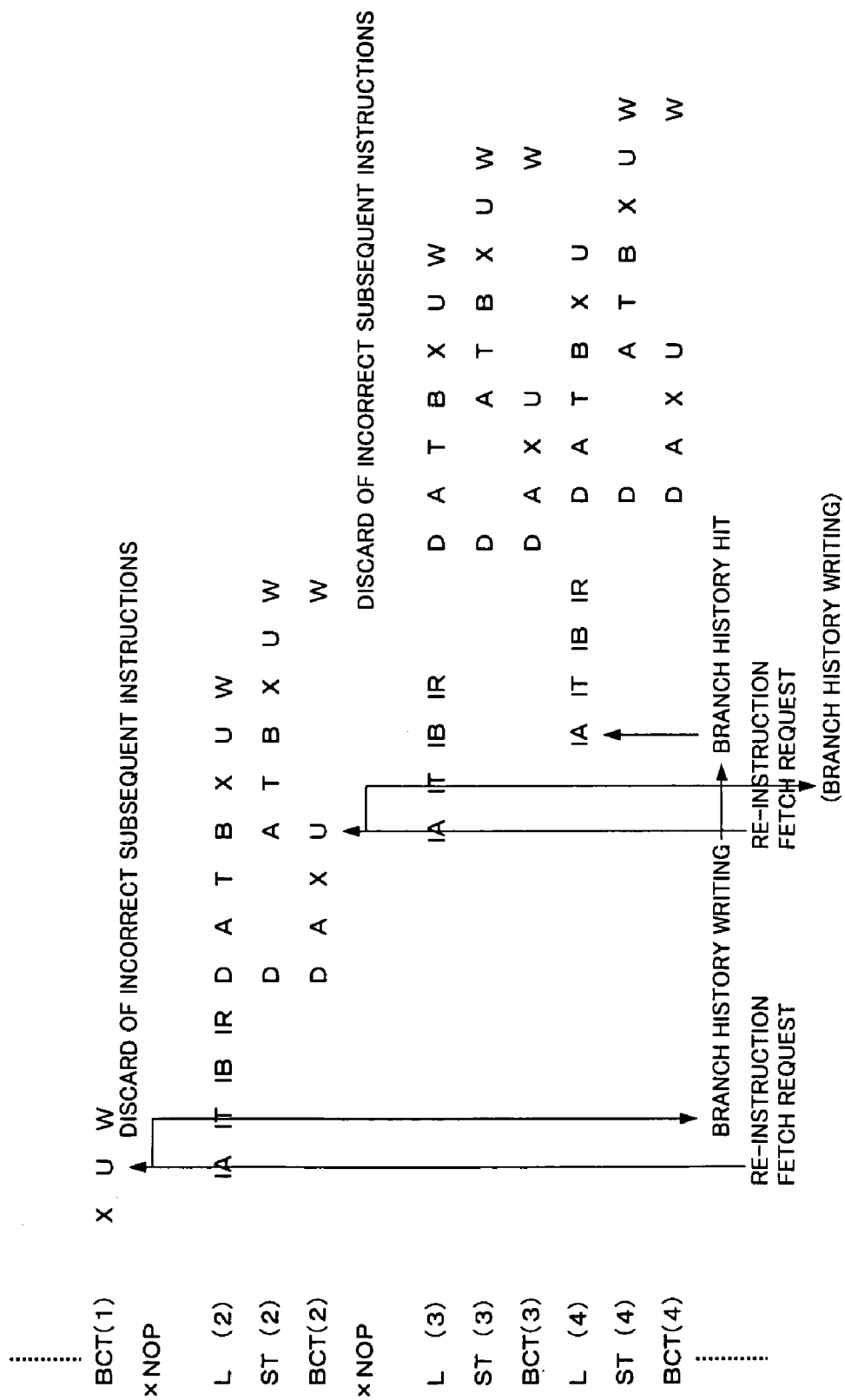
Figure 4A:
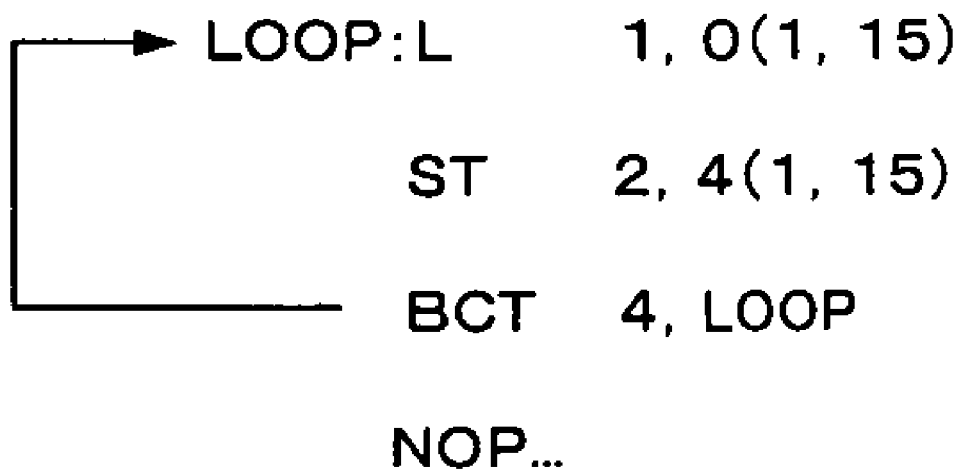

For example, if, as shown in FIGS. 4A and 4B, short loops shown in FIGS. 2A and 2B are executed, conventionally, as shown in FIGS. 2A and 2B, the instruction fetch of the instruction L(3) of the third loop is started in a cycle B of the execution cycle of the instruction L(2) of the second loop. However, in FIGS. 4A and 4B, the instruction fetch of the instruction L(3) is started in the timing of the cycle IB of the instruction L(2) by bypassing the writing and using the branch history information. In this way, according to this preferred embodiment, performance can be improved by six clock cycles compared with the conventional method shown in FIGS. 2A and 2B.

As the RAMs of a branch history, dual port RAMs which can perform writing and reading independently in the same cycle, are used. If there is room in circuit mounting, the performance degradation can be prevented most easily using this method.

FIG. 5 shows the basic configuration of the preferred embodiments of the present invention.

The instruction execution control device of the present invention adopts an out-of-order system. Therefore, in FIG. 5, which concerns an execution control unit, only approximate time dependency is shown.

In this preferred embodiment, it is assumed that an instruction fetch can secure an instruction string of 16 bytes which is 8-byte-aligned, at one request.

First, the address of an instruction to be fetched next is inputted to a selector 11. The addresses to be inputted to the selector 11 are the sequential instruction address which is inputted from an adder 10, the start address for an interruption process, the prediction branch destination instruction address which is the branch prediction result inputted from a branch history, and the branch destination instruction address which is confirmed by a branch instruction process unit 17 executing a branch instruction. The selector 11 is controlled by an instruction execution flow control device (not shown in FIG. 5) which is controlled by an instruction completion process unit 19 for guaranteeing the order of instructions in an out-of-order type information processing apparatus, and is configured to select an appropriate address in each case. The address outputted from the selector 11 is inputted to a branch history 20 as the effective address IF_EAG of the instruction fetch, and simultaneously is inputted to an instruction fetch address register 12 to perform the instruction fetch. The instruction fetch address register 12 inputs an instruction corresponding to the address given by the selector 11, and simultaneously the address of the instruction is inputted to the adder 10. After being stored in a temporary instruction buffer 14, the instruction inputted to an instruction cache 13 is decoded in a decoder 15 and transmitted to the branch instruction process unit 17, an execution instruction process unit 18, and other instruction process units to be processed. In the case of a branch instruction, the execution of branch conditions, etc., is performed in an address calculating unit 16, and the result is inputted to the branch instruction process unit 17. If the branch instruction of the execution is not determined and the execution is described by means of an instruction string, the execution is performed by the execution instruction process unit 18, and the execution result is inputted to the branch instruction process unit 17. Furthermore, the execution completion reports of the branch instruction process unit 17 and execution instruction process unit 18 are processed by an instruction completion process unit 19, and are used to guarantee an instruction execution order and to control an out-of-order type instruction execution order. The address of a branch destination instruction which is determined as an execution result of the branch instruction is inputted to the selector 11 from the branch instruction process unit 17.

Figure 6:
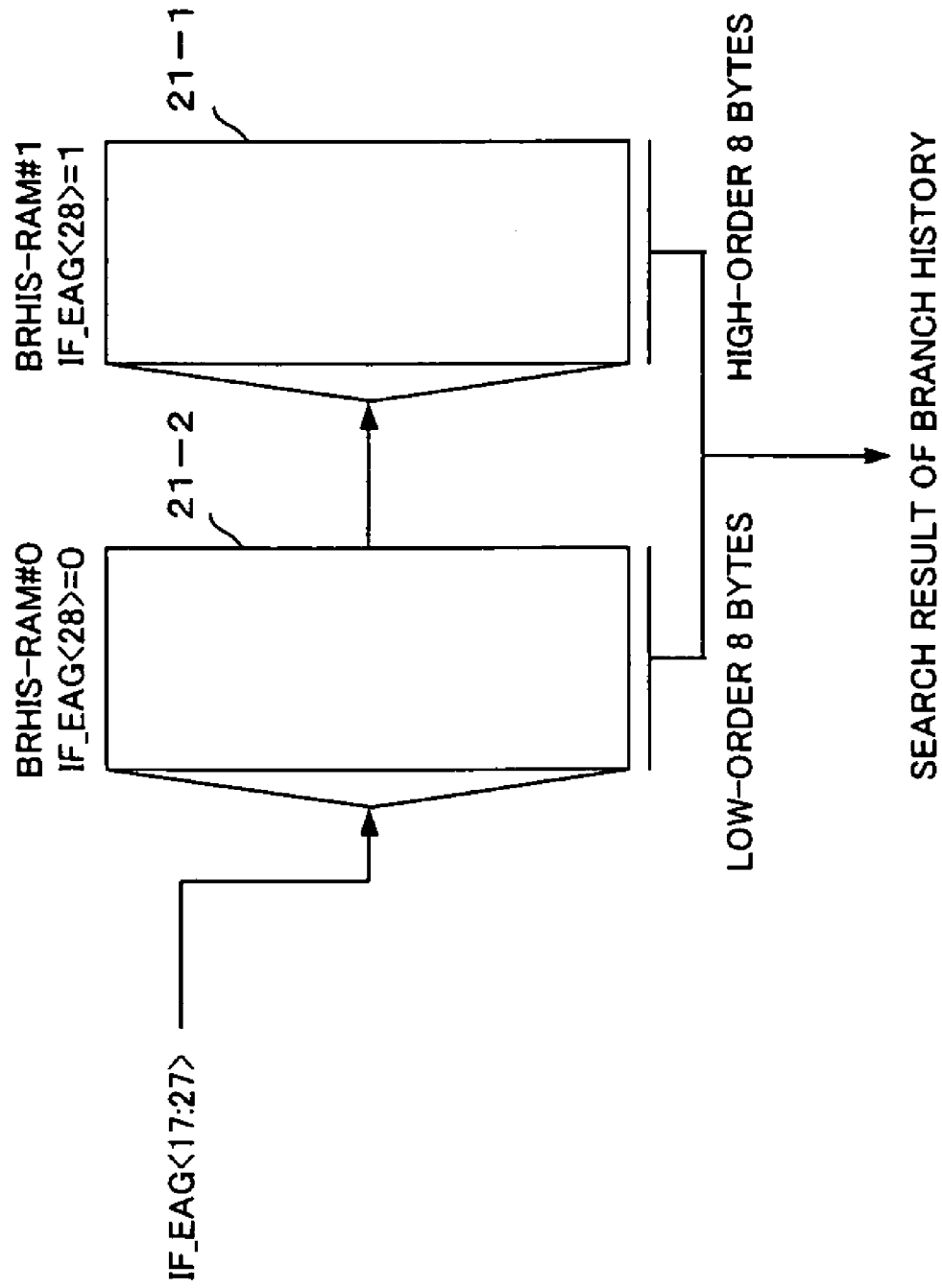
FIG. 6 shows an example configuration of a branch history.

FIG. 6 shows an example configuration of a branch history.

The branch history 20 is comprised of two RAMs 20-1 and 20-2, and these two RAMs 20-1 and 20-2 are configured to search for branch history information in the ranges of high-order 8 bytes and low-order 8 bytes, respectively, using an 8-byte-aligned instruction fetch address. According to this preferred embodiment, the branch history 20 is provided with a return address stack to predict the return destination of a sub-routine return instruction, which is not shown in FIG. 6.

According to this preferred embodiment, the branch instruction process unit 17 in the execution process unit can handle a maximum of four branch instructions, a maximum of one out of four branch instructions is simultaneously prepared for the execution completion, and the branch instruction is transmitted to the instruction completion control unit 19. According to the prior art, branch history information was transmitted to the branch history in this timing.

The instruction completion control unit 19 assigns IIDs to all instructions being executed (from instruction decoding until completion), and manages the execution. In this preferred embodiment, it is assumed that a maximum of 16 instructions can exist in the execution unit. Specifically, it is assumed that any value between 0 and 15 is assigned as the value of the IID.

It is preferable to use as the branch history dual port RAMs which can perform reading and writing simultaneously.

Figure 8:
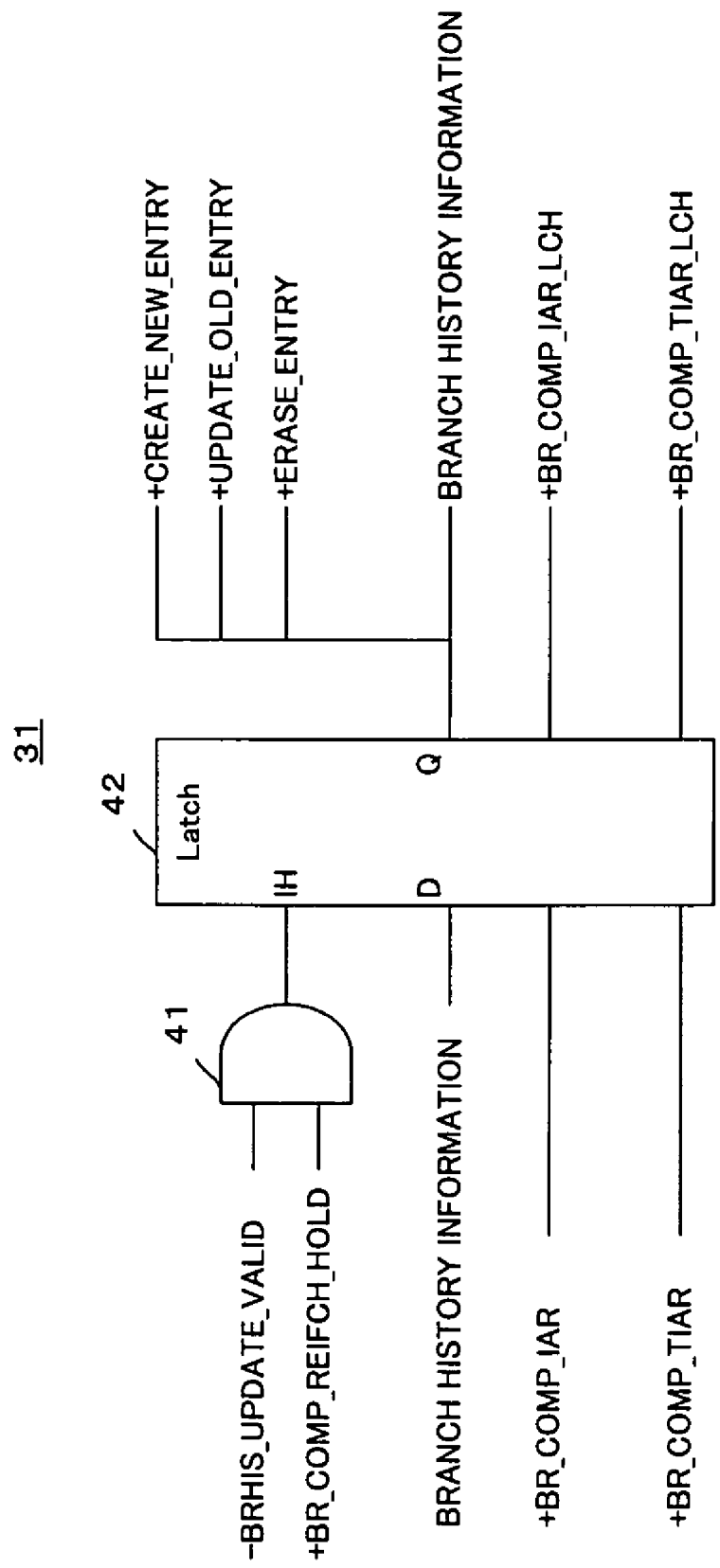
FIG. 8 shows an example detailed configuration of a block 31 shown in FIG. 7.
Figure 9:
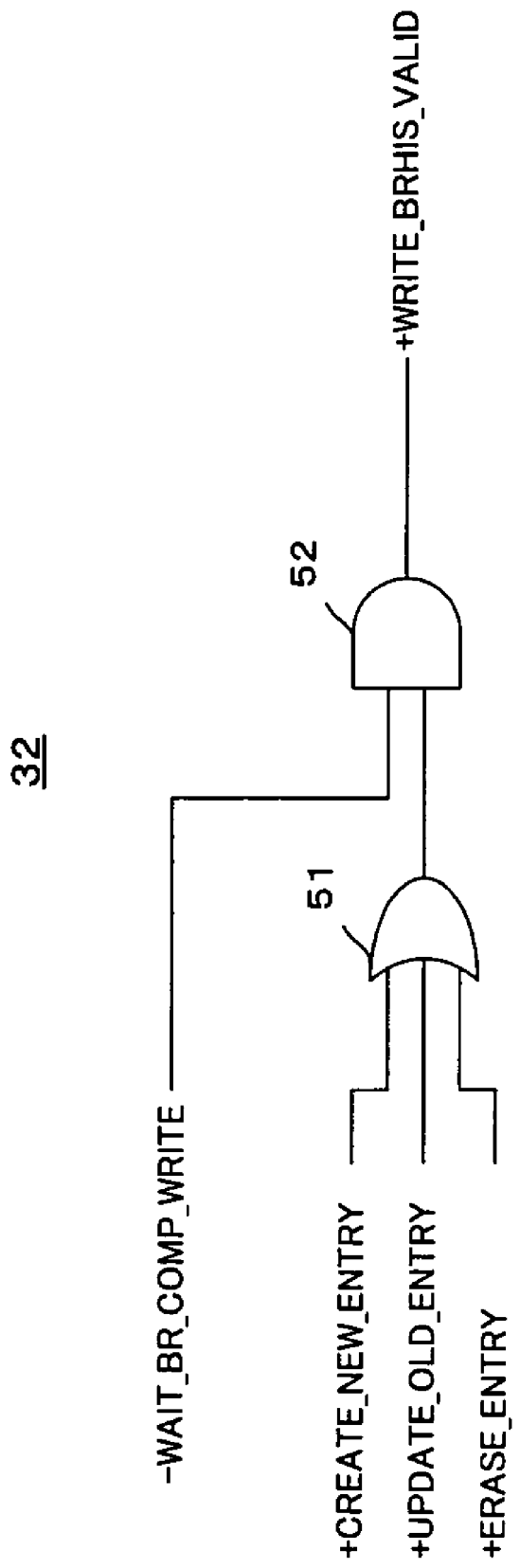
FIG. 9 shows an example detailed configuration of a block 32 shown in FIG. 7.

FIG. 7 shows an example basic configuration for delaying the writing of the branch history information of a branch instruction re-instruction-fetched. FIGS. 8 and 9 show example detailed configurations of the blocks 31 and 32 shown in FIG. 7.

According to this preferred embodiment, if it is found in the branch instruction process unit 17 that a branch prediction has failed, the branch instruction process unit 17 issues a correct branch destination address (or subsequent instruction address) and makes a request for a re-instruction fetch.

At this time, if an instruction cache 13 cannot accept the request for some reason, the re-instruction fetch request is held until the request can be accepted. While the re-instruction fetch request is being held, +REIFCH_REQUEST remains ON. In this case, usually this signal is directly inputted to the block 30. However, a circuit shown in FIG. 13, which is described later, is provided and a signal outputted from this circuit can also be inputted to the block 30 instead.

In this case, there is a possibility that the timing of issuing the request and the timing of writing into the branch history may match. In that case, according to the prior art, priority is given to writing into the branch history 20, and the re-instruction fetch request is further delayed by one or more clock cycles. According to this preferred embodiment, since priority is, without fail, given to the re-instruction fetch request, conventional performance degradation does not occur.

If the re-instruction fetch request (+REIFCH_REQUEST of "H") is inputted to the block 30, both a signal obtained by logically inverting a signal for holding the writing of branch history information in the branch history 20 (−WAIT_BR_COMP_WRITE) and a signal for holding the re-instruction fetch signal of a re-instruction fetch (+BR_COMP_REIFCH_HOLD) are outputted. +BR_COMP_REIFCH_HOLD is inputted to the block 31. −WAIT_BR_COMP_WRITE is inputted to the block 32. The block 31 receives branch information, such as +BR_COMP AS_TAKEN, etc., and further, a branch instruction address (+BR_COMP_IAR) and a branch destination instruction address (+BR_COMP_TIAR) are inputted to the block 31. Then, a signal for controlling an instruction to write in the branch history (+CREATE NEW_ENTRY, +UPDATE_OLD ENTRY, +ERASE_ENTRY), branch history information, a signal obtained by latching a branch destination instruction address (+BR_COMP_IAR_LCH), and a signal obtained by latching a branch destination instruction address (+BR_COMP_TIAR_LCH) are outputted from the block 31. The branch history information and branch destination instruction address are inputted to the port for writing data of the branch history 20. The branch instruction address is inputted to the selector 34 together with an instruction fetch address (+IF_EAG). A signal for instructing to write in the branch history 20 is outputted from the block 32. By this signal, an appropriate address is outputted from the selector 34. Simultaneously, the branch history 20 is made to enter a writable state, and the branch history information, etc., can be written.

FIG. 8 shows an example circuit detail of the block 31 shown in FIG. 7, which stores data while writing is being held up.

A signal obtained by logically inverting a signal indicating whether the update of the entry of the branch history 20 is valid (−BRHIS_UPDATE_VALID) and +BR_COMP_REIFCH_HOLD are inputted to an AND circuit 41. Therefore, if the update of the entry of a branch history is invalid and a re-instruction fetch is requested, branch history information, a branch instruction address and a branch destination instruction address are stored in a latch circuit 42. The branch history information, branch instruction address and branch destination instruction address are outputted from the latch circuit 42. As described with reference to FIG. 7, simultaneously, +CREATE_NEW_ENTRY, +UPDATE_OLD_ENTRY, +ERACE_ENTRY, which are signals for instructing to write in the branch history 20, are extracted from the branch history information and are outputted from the latch circuit 42.

FIG. 9 shows the circuit detail of the block 32 shown in FIG. 7, which generates a signal for controlling branch history writing.

Specifically, if one of a signal for instructing to generate a new entry in the branch history 20 (+CREATE_NEW_ENTRY), a signal for instructing to update an old entry (+UPDATE_OLD_ENTRY) or a signal for erasing the entry of a branch history (+ERASE_ENTRY) is inputted, a signal indicating that writing in the branch history is valid (+WRITE_BRHIS_VALID) is outputted as long as writing in a branch history is not held (when −WAIT_BR_COMP_WRITE is a logic "H"). At this time, the branch instruction address is selected in the selector 34 shown in FIG. 7, and the branch history information is written in the branch history.

Figure 10:
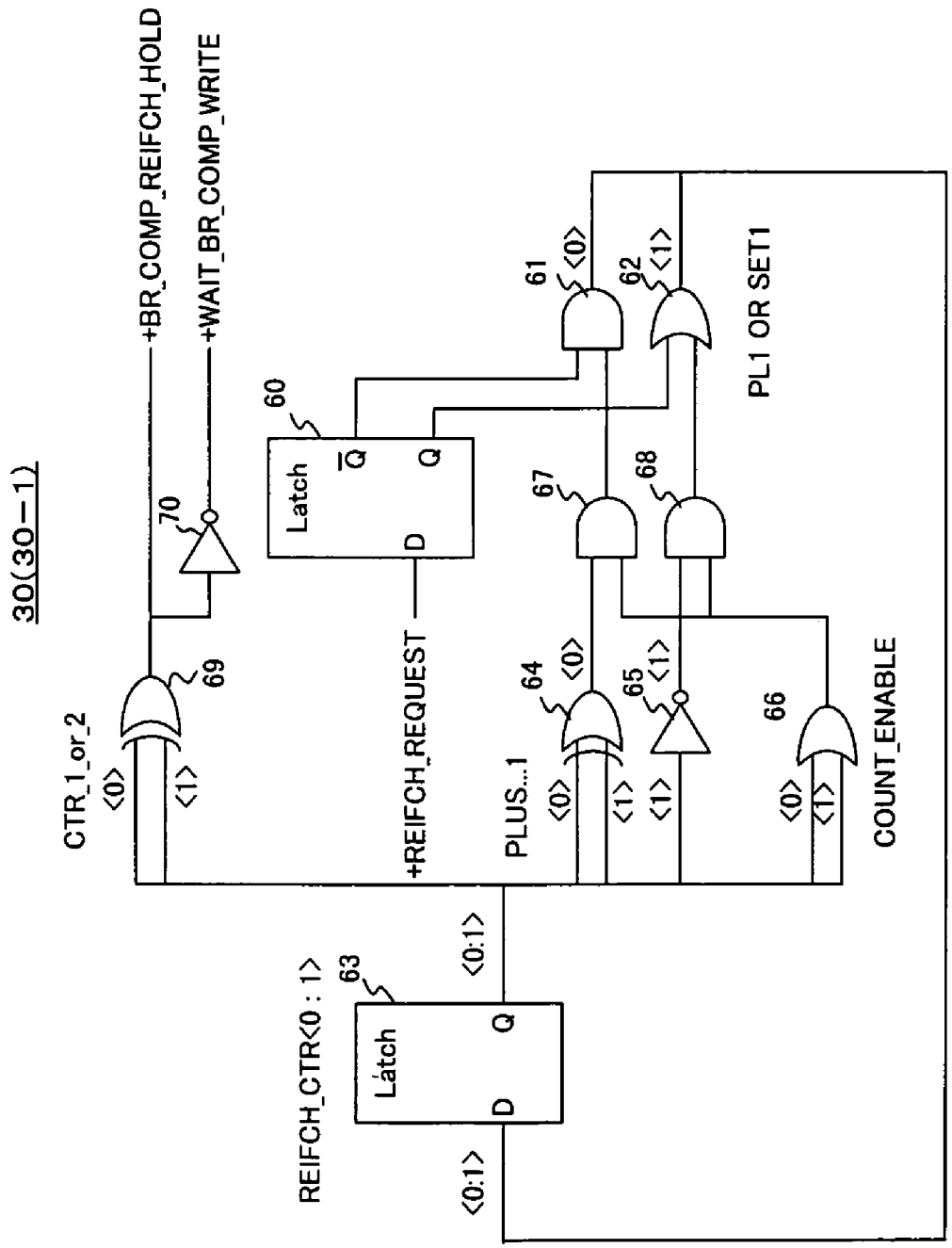
FIG. 10 shows an example of a circuit corresponding to a block 30 shown in FIG. 7.
Figure 11:
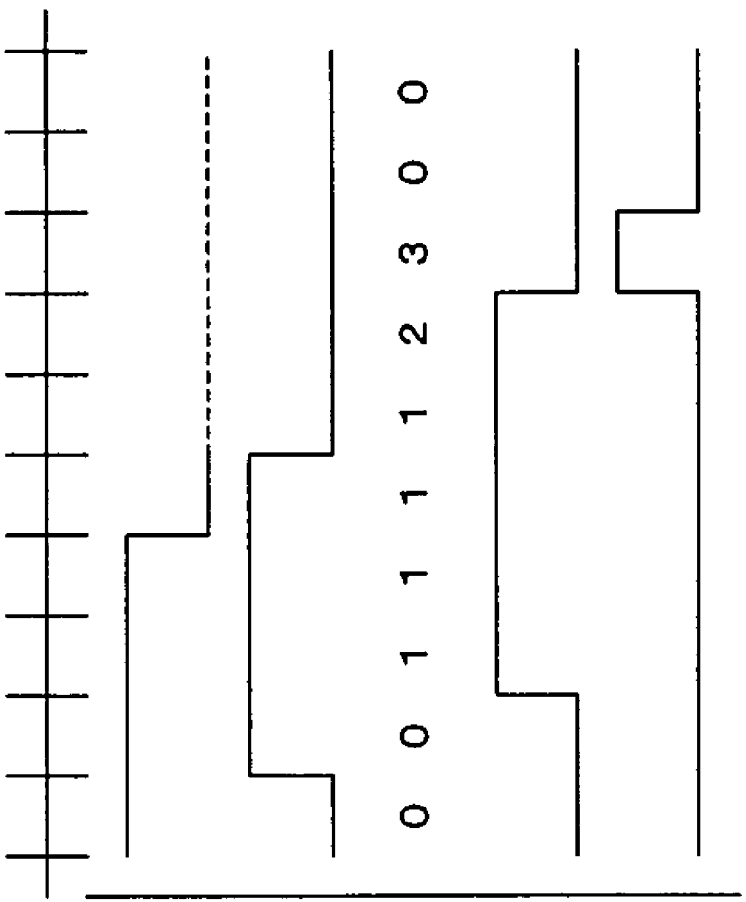
FIG. 11 is a timing diagram of a preferred embodiment using a counter.

FIG. 10 shows an example of a circuit corresponding to a block 30 shown in FIG. 7. FIG. 11 is a timing diagram showing the operation of the circuit shown in FIG. 10.

A counter shown in FIG. 10 executes a re-instruction fetch using a re-instruction fetch request as the trigger of execution start, as shown in FIG. 11 (see FIG. 11(b)), holds writing by two clock cycles (see FIG. 11(d)), writes branch history information in a branch history (see FIG. 11(e)) and returns to an execution waiting (re-instruction fetch request waiting) state. Since by using this method, priority is given to these three instruction fetch requests over a normal re-instruction fetch, this method is applicable to a case where the temporary instruction buffer 14 is empty as well as to a temporary instruction fetch request. In this case, an output shown in FIG. 13 can be inputted instead of a signal +REIFCH_REQUEST, which is one of the input signals shown in FIGS. 7 and 10.

Specifically, the counter shown in FIG. 10 is comprised of two bits, and if +REIFCH_REQUEST is inputted, a signal of positive logic and a signal of inverted logic are inputted to one terminal of an AND circuit 61 and one terminal of an OR circuit 62, respectively, via a latch circuit 60. In FIG. 10, <0> is a high-order bit and <1> is a low bit. If a re-instruction fetch signal is "H", the value stored in a latch circuit 63 becomes "01", and is maintained. If the re-instruction fetch signal becomes "0", "0" and "H" are outputted from the terminal Q of the latch circuit 60 and the inverted terminal of Q, respectively. Therefore, if a counter value "01" is outputted via an EXOR circuit 64, an inverter 65, an OR circuit 66 and AND circuits 67 and 68, both of the counter values outputted from the AND circuit 61 and OR circuit 62 become "10". Since "10" is stored in the latch circuit 63, the output of the EXOR circuit becomes "1", and the outputs of the inverter 65 and OR circuit 66 also become "1". Therefore, both of the outputs of the AND circuits become "1". Then, the re-instruction fetch signal becomes "0". Therefore, "11" and "10" are inputted to the AND circuit 61 and OR circuit 62, respectively, and the value of the counter of two bits becomes "11". If in this way, the re-instruction fetch signal becomes "0", the counter starts counting up to "11". When the count value reaches "11", the count value returns to "00". In response to this count value, the EXOR circuit 69 outputs a re-instruction fetch hold signal +BR_COMP_REIFCH_HOLD when the count value is "01" or "10" (see FIG. 1D). When the count value is "00" or "11", a signal for permitting to write in the branch history 20 −WAIT_BR_COMP_WRITE is outputted.

As described above, if a re-instruction fetch signal of "H" is inputted, the count value changes from "0" to "1", and if the re-instruction fetch signal drops to "L", the count value is counted up. Then, if the count value becomes "3" two clock cycles later, the re-instruction fetch hold signal (+BR_COMP_REIFCH_HOLD) and the signal for permitting to write in the branch history 20 (+WRITE_BRHIS_VALID) become "L" and "H", respectively, and thereby writing in the branch history becomes available.

FIG. 12 shows another preferred embodiment of a circuit corresponding to the box 30 shown in FIG. 7.

In FIG. 12, if a valid instruction is decoded in an instruction decoder 15, a signal +D_VALID becomes ON. The re-instruction fetch signal (+REIFCH_REQUEST) and a signal +D_VALID are provided to a set/reset flip-flop 81 as a set signal and a reset signal, respectively. In this way, the output signal of this flip-flop 81 is maintained from when a re-instruction fetch request is issued until an instruction string corresponding to the request is decoded. Therefore, while the output signal of the flip-flop is ON, the signal +BR_COMP_REIFCH_HOLD is ON, and −WAIT_BR_COMP_WRITE (+BR_COMP_WRITE), which is a signal obtained by inverting a signal outputted from a inverter 82 becomes OFF.

Figure 13:
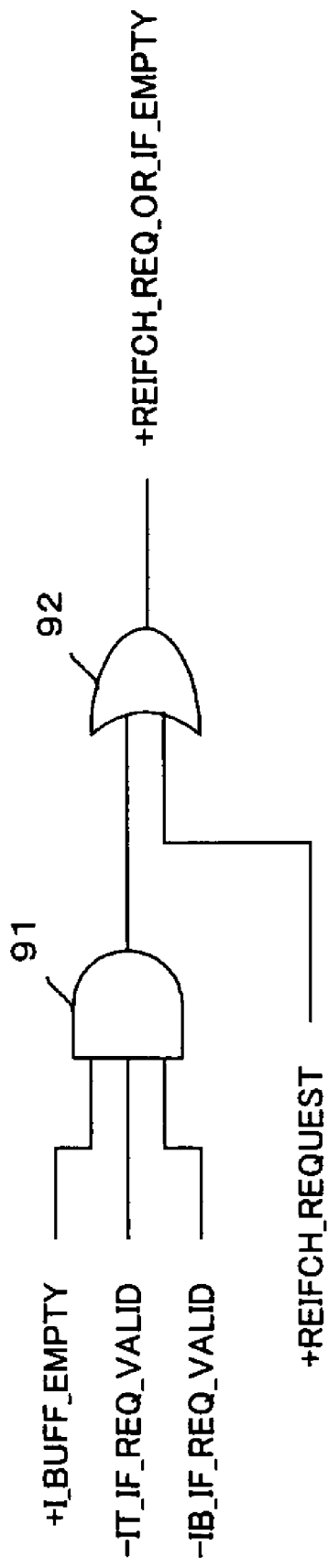
FIG. 13 shows an example circuit configuration for operating the device even if a temporary instruction buffer is empty.

FIG. 13 shows an example circuit configuration for operating the device even if a temporary instruction buffer is empty.

A circuit shown in FIG. 13 provides a signal which replaces +REIFCH_REQUEST, as the input of the box 30 shown in FIG. 7. Specifically, (1) if an instruction buffer 14 is empty (+I_BUFF_EMPTY is "H"), (2) if in a cycle IT, an instruction fetch request is invalid (−IT_IF_REQ_VALID is "H") and (3) if in a cycle IB, the instruction fetch request is invalid (−IB_IF_REQ_VALID is "H"), the output of an AND circuit 91 becomes "H". Therefore, if the three conditions, (1) to (3), above are met or if there is a re-instruction fetch request (+REFECH_REQUEST is "H"), a signal +REIFCH_REQ_OR_IF_EMPTY becomes ON. Then, this signal is inputted to the box 30 shown in FIG. 7 instead of a re-instruction fetch signal.

Figure 15:
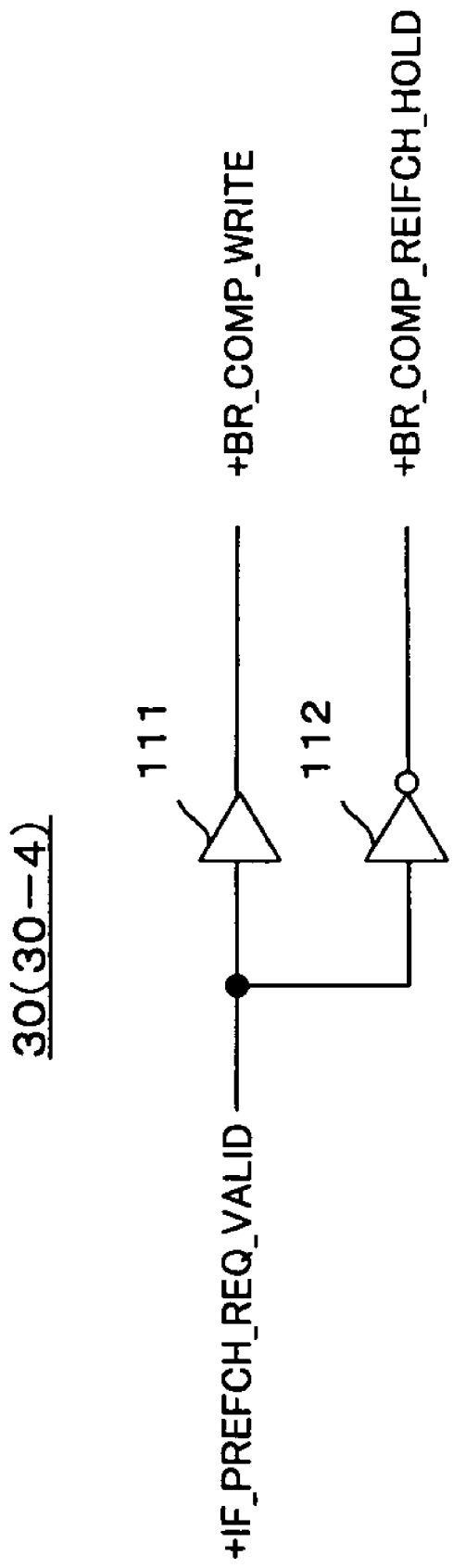
FIG. 15 shows another preferred embodiment of a circuit of a box 30 shown in FIG. 7 (No. 2).

FIGS. 14 and 15 show another preferred embodiment of the box 30 shown in FIG. 7.

FIG. 14 shows an example configuration of the box 30 in the case where if there is a re-instruction fetch, branch history information is not written in the branch history 20, but if the instruction cache 13 cannot accept an instruction fetch, the branch history information is written in the branch history 20. In this case, not an instruction fetch request, but a signal +SU_BUSY, which is transmitted from the instruction cache 13, is inputted as input. The fact that this signal is "H" means that since the instruction cache 13 is full, and an instruction fetch cannot be accepted. In this case, if a signal +SU_BUSY of "H" is inputted, a write permit signal of "H" (+BR_COMP_WRITE) is outputted from a buffer 101 to the branch history 20. If a signal +SU_BUSY of "H" is not inputted, a signal for instructing to temporarily hold a re-instruction fetch of "L" (+BR_COMP_REIFCH_HOLD) is outputted from an inverter 102.

FIG. 15 shows an example circuit configuration of the box 30 shown in FIG. 7 in the case where if there is a request on a real instruction fetch, such as the pre-fetch of an instruction, branch history information is written in the branch history 20. In this case, if a signal, such as an instruction pre-fetch request, etc., is inputted as input, and this signal is "H", a signal for permitting to write in a branch history of "H" (+BR_COMP_WRITE) is outputted from a buffer 111. If the signal is "L", a signal for instructing to temporarily hold a re-instruction fetch of "H" (+BR_COMP_REIFCH_HOLD) is outputted.

Figure 16:
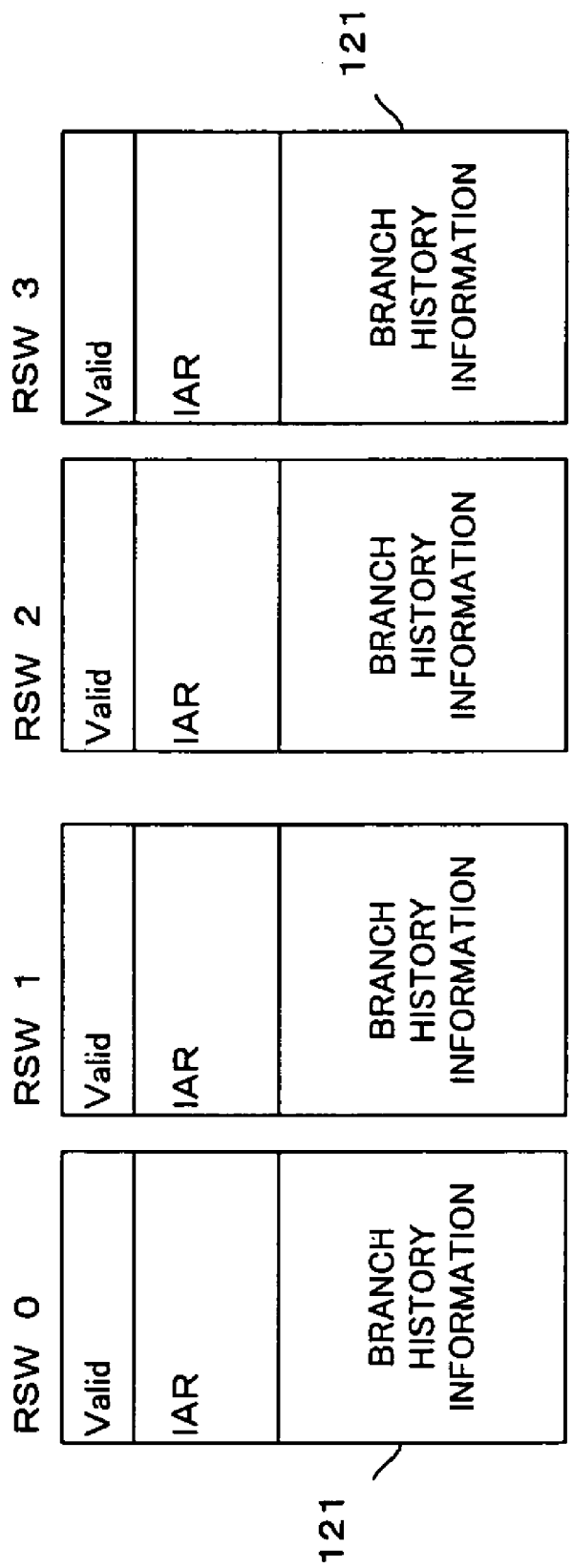
FIG. 16 shows an example configuration of a branch history write reservation station.

FIG. 16 shows an example configuration of a branch history write reservation station.

When an entry is registered in a reservation station, a valid flag (Valid) is set, and by using the signal as a hold signal, branch prediction data (branch history information) is held.

If a reservation station 120 (120-1) shown in FIG. 16 is used, writing in the branch history 20 can also be controlled by using one of the preferred embodiments described above.

The reservation station 120 is comprised of four entries (RSW0–RSW3). In each entry RSWx (x=0–3), a valid flag (Valid) and an instruction address (IAR) are registered, and further branch history information 121 corresponding to the registered instruction is stored.

Figure 17:
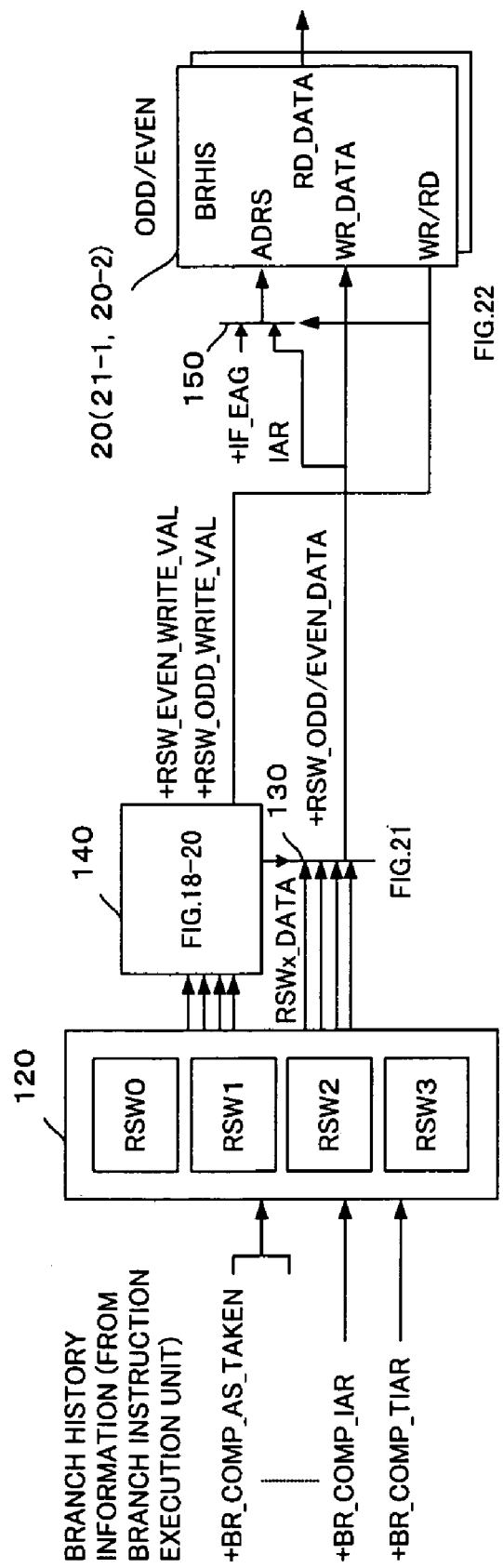
FIG. 17 shows the overall operation flow of the control over writing in a branch history when a reservation station is used.

FIG. 17 shows the overall circuit configuration of a preferred embodiment which controls writing in the branch history 20 in the case where the reservation station 120 shown in FIG. 16 is used.

First, branch history information (+BR_COMP_AS_TAKEN, etc.) is inputted to the reservation station 120 by the branch instruction execution unit, and simultaneously both a branch instruction address (+BR_COMP_IAR) and a branch destination instruction address (+BR_COMP_TIAR) are also inputted. The reservation station 120 is configured as shown in FIGS. 16 and 22–25. From the reservation station 120, data to be written in a branch history for odd addresses 20-1 and a branch history for even addresses 20-2 are outputted via a selector 130 shown in FIG. 21 (+BRW_ODD/EVEN_DATA). Signals outputted from the reservation station 120 are processed in a block 140 to generate an odd address branch history write permit signal (+RSW_EVEN_WRITE_VAL) and an even address branch history write permit signal (+RSW_ODD_WRITE_VAL), respectively, which become signals for permitting to write in the branch histories 20-1 and 20-2, respectively. In a selector 150, either an address IAR transmitted from the reservation station 120 or an address for retrieving from the branch history 20 (+IF_EAG) is selected. In particular, if a write permit signal is received from the block 140, the selector 150 selects the IAR and makes a certain circuit write in the branch history 20. For example, the writing in the branch history 20 is performed by a circuit shown in FIG. 22.

In this preferred embodiment, plurally and simultaneously writing is also performed.

FIGS. 16–20 show control circuits for plurally and simultaneously writing in the branch history 20.

In this preferred embodiment, the branch history is comprised of two RAMs. Therefore, if there are two pieces of branch history information which can be written in the entries of different RAMs, the two different pieces of branch history information can be written in the same cycle.

FIG. 18 shows a selection circuit for plurally and simultaneously writing in a branch history (No. 1).

In the circuit shown in FIG. 18, when simultaneous writing in the two branch histories 20-1 and 20-2 is available, a signal +WRITE_DOUBLE is ON.

In FIG. 18, two valid flags of the entry of the reservation station 120 (+RSWx_VALID) are inputted to each of six AND circuits 141-1–141-6. A circuit 140A located in the upper section of FIG. 18 is a write signal selection circuit used when one entry of the reservation station 120 is written into the branch histories 20-1 and 20-2. If the two valid flags are added up and both of them are valid, a signal of "H" is inputted to one of the AND circuits 142-1–142-6. If the fourth bits from the right ends of the addresses of the entries of two reservation stations RSWx are compared and the bits are different, "H" is inputted to the input terminal of another of the AND circuits 124-1–142-6. This is because in the branch history 20, an instruction is stored in units of 16 bytes and if there are 16 or more different write addresses, the addresses are written in the low-order 8 bytes and the high-order 8 bytes of the branch histories 20-1 and 20-2, respectively. Then, the device is controlled in such a way that the combinations of two addresses with priority are written in the branch history 20 with priority in a priority determination circuit 143. If the signal of one of the AND circuits 142-1–142-6 is ON, a plurally writable signal (+WRITE_DOUBLE) is outputted.

A circuit 140B located in the lower section of FIG. 18 is a write signal selection circuit used when one entry of the reservation station 120 is written into the branch history 20. If either of the valid signals of the entry of each reservation station RSWx is ON, a signal indicating that data to be written is available (+WR_DATA_AVAILABLE) is outputted. Priority is set to the writing of each entry of the reservation station 120 by a circuit 146. If a plurally writable signal is OFF and +WR_DATA_AVAILABLE is "H", a single write signal (+WRITE_SINGLE) is outputted and simultaneously a signal indicating which entry of the reservation station 120 should be written (+WRITE_RSWx) is outputted.

In FIG. 18, the output of this AND circuit can also be used instead of the signal +RSWx_VALID by providing an AND circuit 149 as shown in the upper left section of FIG. 18. In this case, the signal +RSWx_VALID and a signal −RSW_CSE_VALID, which is described later, are inputted. After an instruction execution is completed, writing in the branch history 20 can be performed using these signals. Specifically, if the instruction is not completed, the signal +RSW_CSE VALID is ON. How to generate this signal is described later.

FIG. 19 shows a selection circuit for plurally and simultaneously writing in a branch history (No. 2).

In FIG. 19, the output from the single write selection circuit 140B shown in FIG. 18 and the 28th bit of an instruction address (IAR) outputted from the reservation station 120 are inputted to AND circuits 151 (151-1-151-4). By checking whether a write signal inputted from the single write selection circuit and the 28th bit of an instruction address are ON or OFF, a write permit signal used when the instruction address is odd, is outputted. Then, if one of the AND circuits 151-1–151-4 is ON, the writing of an odd address is permitted. Therefore, if this signal is outputted, a signal for permitting to write in the odd branch history 20-1 (+RSW_ODD_WRITE_VALID) is outputted. If the double write signal (+WRITE_DOUBLE) is ON, writing in the odd branch history 20-1 and even branch history 20-2 are permitted. Specifically, +RSW_ODD_WRITE_VALID and +RSW_EVEN_WRITE_VALID are turned ON. If the writing in the odd branch history 20-1 is OFF, a signal to be inputted to an AND circuit 66 becomes ON. Furthermore, if the single write signal (+WRITE_SINGLE) is ON, a signal for permitting to write in the even branch history 20-2 (+RSW_EVEN WRITE VALID) becomes ON. If either a signal indicating that writing in the branch history 20 is not held (−WAIT_BR_COMP_WRITE) or a signal for compulsorily writing in the branch history 20 (+FORCE_WRITE_BRHIS) is ON, this signal for permitting to write in the odd or even branch history is outputted. +FORCE WRITE_BRHIS is described later.

Figure 20:
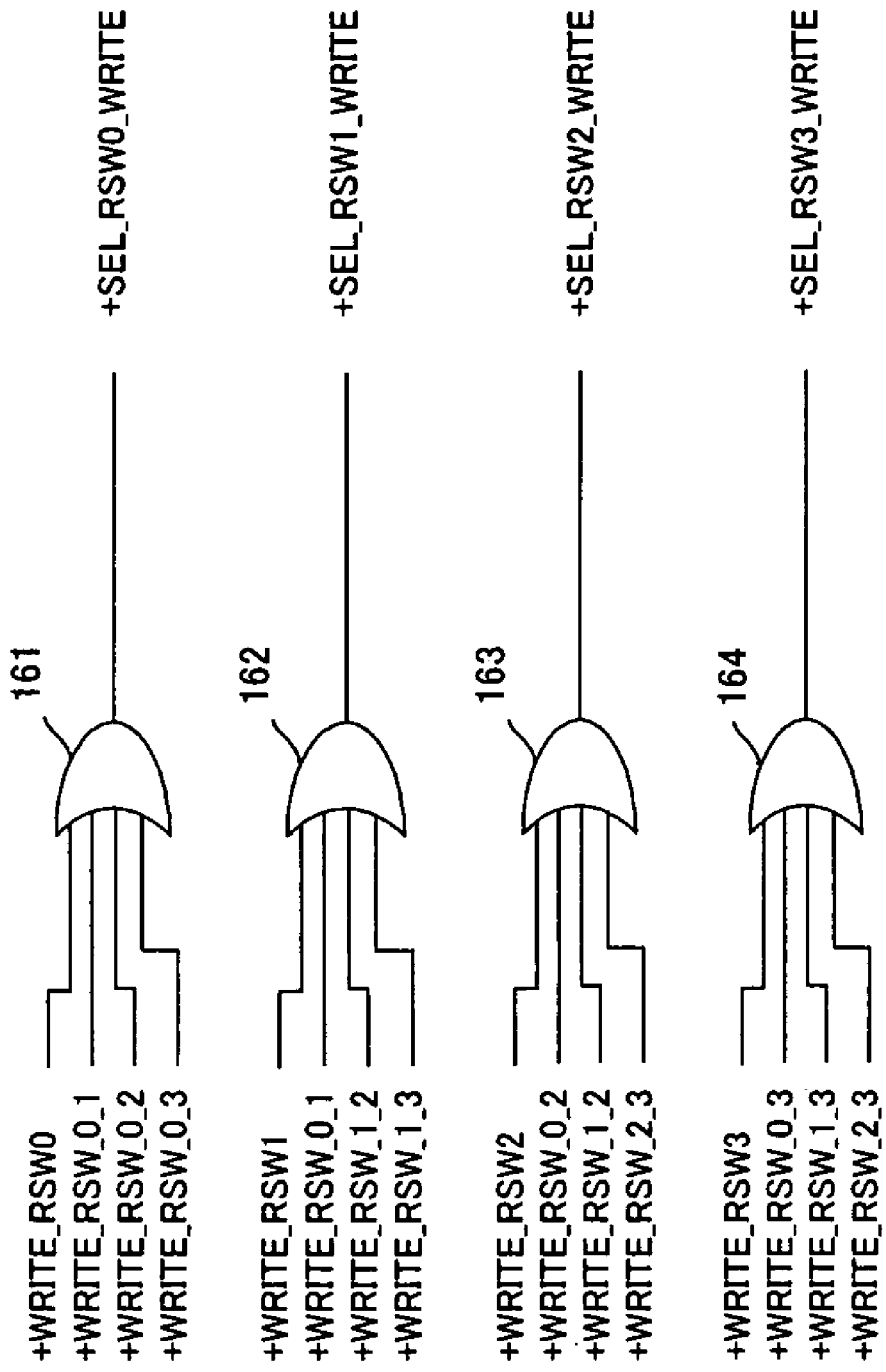
FIG. 20 shows a selection circuit for plurally and simultaneously writing in a branch history (No. 3).

FIGS. 20 and 21 show selection circuits for plurally and simultaneously writing in branch histories (No. 3) (No. 4).

A circuit shown in FIG. 20 generates select signals for writing in the entries RSW0–RSW3 of the No. 1 through No. 3 branch histories of the reservation station 120 (+SEL_RSWx_WRITE) using the output shown in FIG. 18 as input, and inputs the signals to a circuit shown in FIG. 21.

The circuit shown in FIG. 21 selects data transmitted from the reservation station 120 (RSWx_DATA). In FIG. 21, a selection circuit for an odd branch history 20-1 and a selection circuit for an even branch history 20-2 are separately configured. Data from the reservation station 120 are inputted to multiplexers 181 and 182, and one of the pieces of data is transmitted as RSW_OLD_DATA or RSW_EVEN_DATA.

The multiplexer 181 adds a select signal (+SEL_RSWx_WRITE), which is the output of the circuit shown in FIG. 20, to the 28th bit of an instruction address (IAR) inputted from the RSW0 to RSW3 of the reservation station 120, and switches the operation based on the result. In this way, if the select signal is ON and the instruction address is odd, a select signal is transmitted and corresponding data are transmitted.

In the same way, the multiplexer 182 adds a select signal, which is the output of the circuit shown in FIG. 20, to a signal obtained by logically inverting the 28th bit of an instruction address inputted from the RSW0 to RSW3 of the reservation station 120, and switches the operation based on the result. In this way, if the select signal is ON and the instruction address is even, corresponding data are transmitted.

FIG. 22 shows a circuit for plurally and simultaneously writing in a branch history.

An address for writing an instruction in the odd branch history 20-1 (RSW_ODD_IAR) and an address for reading from the branch history (IF_EAG) are inputted to a selector 191. In the same way, an address for writing an instruction in the even branch history 20-2 (RSW_EVEN_IAR) and an address for reading from the branch history 20 (IF_EAG) are inputted to a selector 192. +RSW_ODD_WRITE_VALID, which is the output of the circuit shown in FIG. 19, is also inputted to the selector 191. The device is configured in such a way that if writing in the odd branch history 20-1 is permitted, the selector 191 selects RSW_ODD_IAR. Similarly, the device is configured in such a way that if +RSW_EVEN_WRITE_VALID, which is the output of the circuit shown in FIG. 19, is inputted and writing in the even branch history is permitted, the selector 192 selects the RSW_EVEN_IAR. Write-enable is set in the odd branch history 20-1 and even branch history 20-2 by +RSW_ODD_WRITE_VALID and +RSW_EVEN_WRITE_VALID, respectively, and RSW_ODD_DATA and RSW_EVEN_DATA, respectively, are written.

Figure 24:
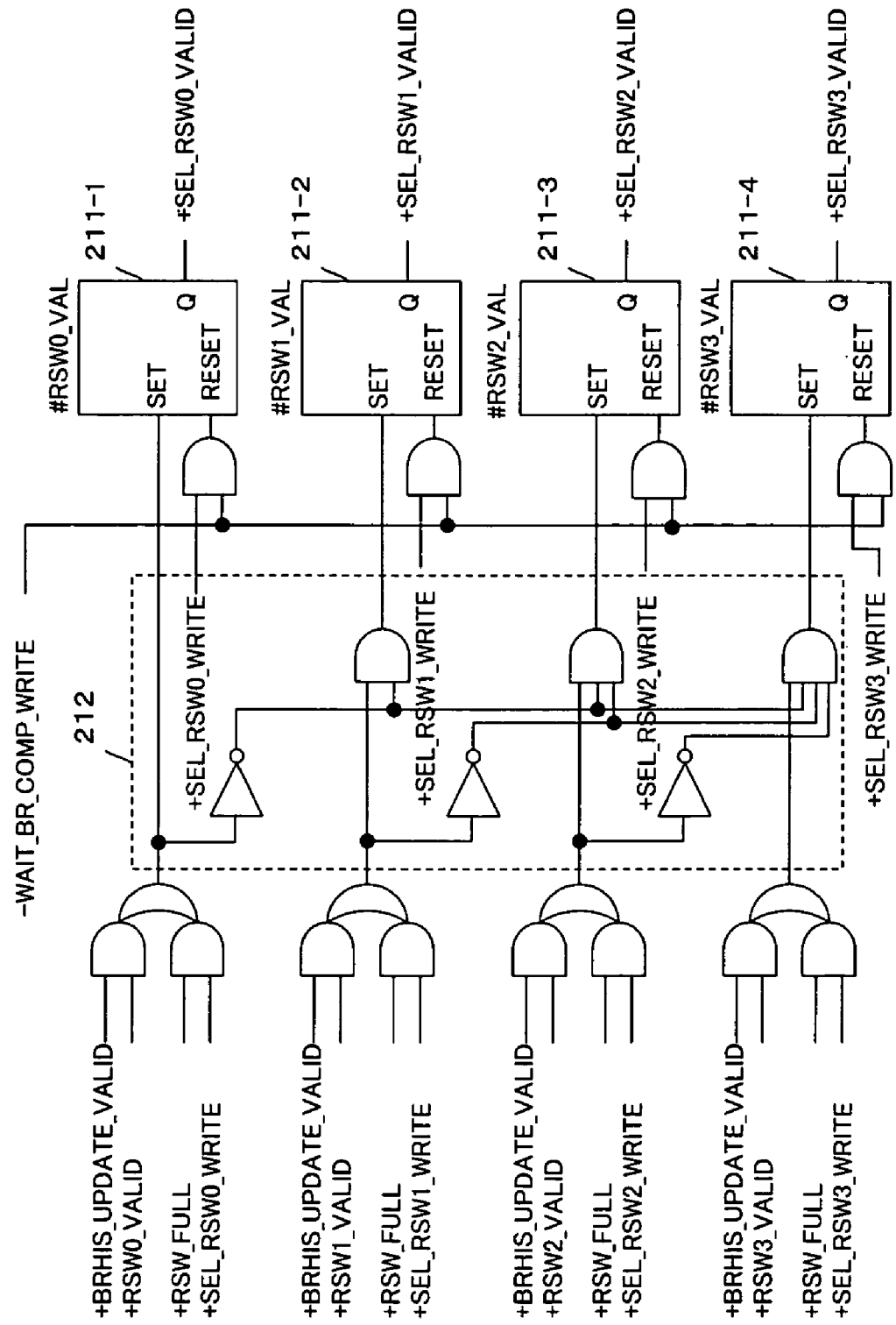
FIG. 24 shows an example of the valid circuit of a write reservation station.

Furthermore, if in this preferred embodiment, the reservation station 120 is full and data to be written are further transferred from the branch instruction control unit, at least one piece of data being stored can be written. FIGS. 23 and 24 show this preferred embodiment.

FIG. 23 shows an example circuit configuration of a circuit for compulsorily writing in a branch history.

If the valid signal of an entry from a circuit shown in FIG. 24 (+RSWx_VALID) is inputted to an AND circuit 201 and all the entries of all the reservation stations 120 are valid, the reservation stations are full. Therefore, in this case, a signal indicating this +RSW_FULL is outputted. If the update of the branch history 20 is valid, +BRHIS_UPDATE_VALID inputted from the branch instruction process unit 17 becomes ON, a signal for compulsorily writing in a reservation station +FORCE_WRITE_BRHIS is generated and used in the operation shown in FIG. 19.

FIG. 24 shows an example configuration of the valid circuit of a reservation station 120.

If the update of the branch history 20 is valid (+BRHIS_UPDATE_VALID is ON) and the entry RSW0 of the No. 1 branch histories of a reservation station 120 is invalid (−RSW0_VALID is ON) or if the reservation station is full (+RSW_FULL) and the No. 0 branch history of the reservation station 120 is selected (+SEL_RSW0_WRITE, which is the output shown in FIG. 20, is ON), a set signal is transmitted to a flip-flop 211-1, and a signal indicating that the No. 0 branch history of the reservation station 120 is valid (+RSW_VALID) becomes ON. In the same way, the same setting is made in the No. 1 through No. 3 branch histories of the reservation station 120. However, priority is set according to the ascending order of the number of the reservation station 120 by a priority setting circuit 212. If writing in the branch history 20 is not held (−WAIT_BR_COMP_WRITE is ON) and writing in the reservation station 120 is selected next, the flip-flops 211-1–211-4 reset the valid signal of the entry of the reservation station 120. The output of the circuit shown in FIG. 24 becomes the input to the circuit shown in FIG. 23.

Specifically, a signal for holding writing by +WAIT_BR_COMP_WRITE shown in FIG. 19 is suppressed by a signal +FORCE_WRITE_BRHIS, and writing in the branch history 20 is compulsorily performed. Simultaneously, the entry of data to be written is registered. By adopting the interleave write system described above, a maximum of two piece of data can be written in this preferred embodiment.

For example, according to a set associative system, a lot of writing can also be simultaneously performed by controlling a way by +CREATIVE_NEW, +UPDATE_OLD_ENTRY, +ERACE_ENTRY or another way selecting signal, etc.

FIG. 25 shows an example configuration of a reservation station in the case where writing in the reservation station is available after the completion of an instruction execution under IID (Instruction ID) control.

In FIG. 25, in addition to the configuration shown in FIG. 16, the reservation station 120 (120-2) is configured to register both a CSE-Valid flag, which is described later, and the IID of the instruction completion process unit 19. By doing this, a signal RSWx_CSE_VAL shown in FIG. 26 can be utilized, and whether an instruction is executed and completed can be judged.

A CSE-Valid flag is turned off by comparing the ID of an executed and completed instruction inputted from the instruction complete process unit 19 (COMMIT_BR_IID) with IID entries in the reservation station 120. If an instruction execution is temporarily stopped due to an interruption, etc., the CSE-Valid flag is compulsorily turned off by a signal +FLUSH_RS. By doing this, an entry corresponding to an instruction for which the execution could not be completed due to an interruption, etc., does not remain.

If the CSE-Valid flag is ON, the execution of an instruction is not completed yet. Therefore, a signal obtained by suppressing a signal +RSWx_VALID using this flag can be transmitted to a write selection circuit instead of +RSWx_VALID shown in FIG. 18.

FIG. 26 shows an example configuration of the CSE valid circuit of a write reservation station.

The update valid signals of the branch history 20 of the respective entries RDW0–RSW3 of the No. 1 through No. 3 branch histories of the reservation station 120 (+BRHIS_UPDATE_VALID) are ON and the reservation station 120 is invalid (−RSWx_VALID is ON) or if the reservation stations are full (+RSW_FULL is ON) and the reservation station 120 is selected (+SEL_RSWx_WRITE), concerning the No. 0 branch history of the reservation station 120, a signal is inputted to the set ports of flip-flops 221-1–221-4, and a signal +RSWx_CSE_VALID is outputted. The same process applies to the No. 1 through No. 3 of the reservation station 120. However, in these cases, a priority circuit 223 is provided in mid-course. This priority circuit 223 is configured in such a way that priority decreases in ascending order of the number of reservation stations.

If COMMIT_BR_IID inputted from the instruction completion process management unit 19 in a cycle W and RSWx_IID recorded in the reservation station 120 are compared by comparators 222 (222-0–222-3) and if the signals match, the flip-flops 221-1–221-4 are reset. If a signal +FLUSH_RS outputted at the time of re-instruction fetch is inputted, the flip-flops 221-1–221-4 are also reset. Alternatively, if −RSWx_VALID, which is a signal obtained by logically inverting the output of the circuit shown in FIG. 24, is ON, the flip-flops 221-1–221-4 are reset.

If in a circuit shown in FIG. 26, a signal −RSWx_VALID is simultaneously inputted to OR circuits 224-0–224-3 and AND circuits 225-0–225-3, there is a possibility that a set signal and a reset signal may be simultaneously inputted. In this case, the circuit is configured in such a way that priority is given to the set signal.

FIG. 27 shows the data storage configuration of the write reservation station shown in FIG. 25.

If branch history information is inputted to a latch circuit 230 and +RSWx_VALID becomes ON, the branch history information is stored and outputted as RSWx_branch history information.

Here, x corresponds to the digits 0 through 3, and the same number of the circuit shown in FIG. 27 as the entries of the reservation station 120, specifically, the number of entries of No. 1 through No. 3 branch histories of the reservation station 120 are provided.

Figure 28:
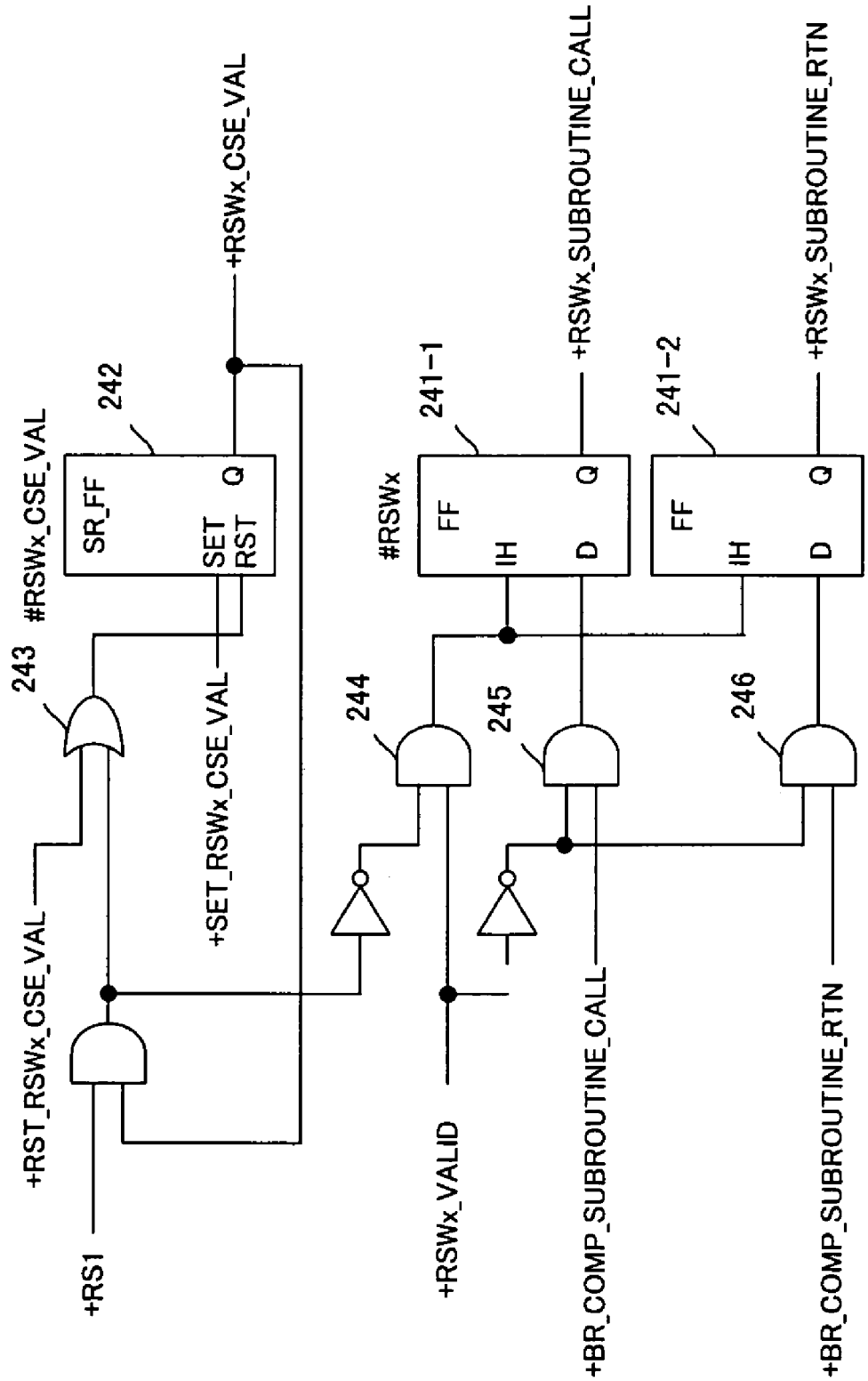
FIG. 28 shows an example configuration of a CSE valid circuit in the case where a branch prediction unit is provided with a return address stack.

FIG. 28 shows an example configuration of a CSE valid circuit in the case where a branch prediction unit is provided with a return address stack.

A return address stack is configured to operate if a completed branch instruction (to write history information) corresponds to a sub-routine call instruction or sub-routine return instruction.

When there is a temporary execution stoppage due to an interruption, etc. (a signal +RS1 is ON), it is sufficient if information indicating that the instruction corresponds to the sub-routine call or return of the branch history information which exists in the reservation station 120 is nullified instead of turning a Valid signal (the CSE-Valid flag of the reservation station 120) (see FIG. 25) off. It is sufficient if the branch history information is written in a timing available at this point. Therefore, the CSE-Valid flag is reset. +SET_RSWx_CSE_VAL and +RST_RSWx_CSE_VAL shown in FIG. 28 correspond to signals inputted to the respective set and reset terminals of the set/reset flip-flops 221-1–221-4 shown in FIG. 26.

Two portions including the flip-flops 241-1 and 241-2 located in the lower section are extracted to indicate that the portions are the sub-routine call instruction and sub-routine return instruction of the branch history information shown in FIG. 27.

Specifically, if +SET_RSWx_CSE_VAL is inputted, the set/reset flip-flop 242 is set and +RSWx_CSE_VAL is turned ON. If +RST_RSWx_CSE_VAL is inputted or +RS1 becomes ON, +RSWx_CSE_VAL is reset and turned OFF.

If +RS1 is ON and +RSWx_CSE_VAL is also ON, the output of an AND circuit 244 becomes "0" and the flip-flops 241-1 and 241-2 are reset. If +RSWx_VALID, which is the output of the circuit shown in FIG. 24, is OFF and the instruction is a sub-routine call instruction, +BR_COMP_SUBROUTINE_CALL becomes ON and is inputted to the flip-flops 241-1 and 241-2. In this case, if the instruction is a sub-routine return instruction, +BR_COMP_SUBROUTINE_RTN becomes ON and is inputted to the flip-flops 241-1 and 241-2.

Specifically, if an instruction execution is not completed (+RSWx_CSE_VAL=0) or there is no temporary execution stoppage due to an interruption, etc., (+RS1 =0) and the entry of the reservation station 120 is valid (+RSWx_VALID=1), an ON signal is inputted to the terminal IH of the flip-flops 241-1 and 241-2, and a signal indicating that the instruction is a sub-routine call instruction or a sub-routine return instruction is stored and outputted as +RSWx_SUBROUTINE_CALL or +RSWx_SUBROUTINE_RTN.

FIG. 29 shows an example circuit for nullifying the entry of the reservation station if an instruction execution is temporarily stopped due to an interruption, etc.

+SET_RSWx VAL, which is a signal to be inputted to the set terminal of each of the flip-flops 211-1–211-4 shown in FIG. 24, is inputted to the set terminal of a set/reset flip-flop 251 and is outputted as +RSWx_VALID. If +RST_RSWx_VAL to be inputted as the reset signal shown in FIG. 24 is inputted or an execution is temporarily stopped due to an interruption, etc., (+RS1=1) and an instruction execution is not completed yet (+RSWx_CSE_VAL=1), the set/reset flip-flop 251 is reset.

FIG. 30 shows one preferred embodiment of a bypass hit circuit.

An address comparison (branch prediction) unit 263 comprised of seven comparators 265 (265-1–265-7) varies depending on the nature of the branch prediction method of the branch history 20 and should be appropriately configured by a person having ordinary skill in the art. Therefore, only a brief description is made of the address comparison unit 263. Writing is bypassed and data in the write reservation station 120 and branch prediction unit (RSBRx in FIG. 30) can be designated as a search target by generating a branch destination address BRHIS_TIAR.

Specifically, the address comparison unit 263 compares an inputted address IF_EAG requested to be read with the branch history 20 (BRHIS-RAMs #0 and #1), the entries #RSW0–3 of the reservation station 120 and an instruction addresses IAR which are outputted from the branch prediction unit #RSBRx. If these respective compared signals match, the address comparison unit 263 outputs corresponding branch destination address TIAR from selection circuits 267-1–267-7. Then, one of these signals is selected by a selection circuit 268 and is outputted as the branch destination address of the branch history (BRHIS_TIAR). If in the branch prediction unit, a branch destination address generated inside is valid and the branch prediction succeeds, the address comparison unit outputs a branch destination instruction address to the selection circuit 267-7.

By combining the configurations described above, the performance of the information processing apparatus can be improved.

Although in the preferred embodiments described above, a lowercase x is attached to the ends of symbols, like RSWx for example, in the case of a reservation station, this means that a lowercase x can take digits 0 through 3 and there are configurations and signals corresponding to the respective digits. In other cases, an x suffix means that there are the same number of configurations and signals corresponding to symbols with the suffix as the number indicated by the suffix, and represents the configurations and signals.

According to the present invention, in the execution of a branch instruction, an instruction fetch request can be processed with priority by delaying the timing of writing of an entry in a branch history, and the process delay can thereby be avoided.

Furthermore, according to the present invention, if the branch history of a branch instruction which has not been actually executed is reported, the branch history is registered, but a return address stack is not operated. Therefore, the correspondence between a subsequent sub-routine call and a subsequent sub-routine return is prevented from collapsing, and thereby failure in the prediction of the branch destination address of a sub-routine return instruction can be reduced.

What is claimed is:

1. A branch history information write control device in an instruction execution processing apparatus, comprising:
    a memory unit storing an instruction string;
    branch prediction unit performing a branch prediction of a branch instruction; and
    a control unit controlling the memory unit and the branch prediction unit in such a way that writing of branch history information in the branch prediction unit and control over fetching of the instruction string in the memory unit may not occur simultaneously,
    wherein said control unit uses a counter to count several clock cycles (several states) to delay, for a period of several clock cycles (several states), the writing of the branch history information and control, beforehand, the fetching of the instruction string.

2. The device according to claim 1, wherein said control unit writes the branch history information in said branch prediction unit in a timing such that said memory unit cannot accept an instruction fetch request.

3. The device according to claim 1, wherein said control unit writes the branch history information in said branch prediction unit in a timing for making an instruction pre-fetch request.

4. The device according to claim 1, wherein when writing in said branch prediction unit the branch history information about a branch instruction which has failed in a branch prediction, said control unit writes the branch history information in said branch prediction unit after several clock cycles (several states).

5. The device according to claim 1, wherein when writing in said branch prediction unit the branch history information about a branch instruction which has failed in a branch prediction, said control unit writes the branch history information in said branch prediction unit after a re-instruction fetch request by the branch instruction is executed and several clock cycles (several states) after the re-instruction fetch request is executed.

6. The device according to claim 1, wherein if the instruction execution processing apparatus is provided with a temporary instruction buffer unit temporarily storing an instruction string outputted from said memory unit, said control unit writes the branch history information of the branch instruction in said branch prediction unit several clock cycles (several states) after there is a write request of a branch instruction if the temporary instruction buffer unit is empty and there is no instruction fetch request.

7. The device according to claim 1, wherein if the instruction execution processing apparatus is provided with a temporary instruction buffer unit temporarily storing an instruction string outputted from said memory unit, said control unit does not promptly write a branch history of a branch instruction to be requested to be written in said branch prediction unit, waits for a next instruction fetch request and writes the branch history information of the branch instruction several clock cycles (several states) after the instruction fetch request is executed if the temporary instruction buffer unit is empty and there is not even one instruction fetch request.

8. The device according to claim 1, wherein when writing the branch history information of the branch instruction which has failed in the branch prediction, said control unit writes the branch history information after an instruction decoding unit or a temporary instruction buffer unit in the instruction execution processing apparatus receives a fetch instruction string corresponding to a re-instruction fetch requested by the branch instruction.

9. The device according to claim 1, further comprising:
a write reservation station unit temporarily storing the branch history information to be written.

10. The device according to claim 9, wherein said control unit registers in the reservation station unit only the branch history information concerning a branch instruction which must be written in said branch prediction unit.

11. The device according to claim 9, wherein the branch history information is about at least one of a new entry registration, an entry content change or an entry erasure.

12. The device according to claim 9, wherein if said write reservation station unit is full and there is a request for registering in the write reservation station unit, said control unit writes in said branch prediction unit least one group of branch history information, writing of which in the write reservation station unit is held and the branch history information of which has been requested to be registered.

13. The device according to claim 1, wherein if a branch instruction which is resolved is taken or not and it is determined the branch destination address cannot be completed because of an in-flight preceding branch instruction(s), said control unit writes the branch history information of the branch instruction in said branch prediction unit or registers the information in the write reservation station unit.

14. The device according to claim 9, wherein said control unit writes the branch history information, writing of which in the write reservation station unit is held when an execution of an instruction is completed.

15. The device according to claim 9, wherein said control unit writes branch history information of a corresponding entry in said branch prediction unit or said write reservation station unit when an execution of an instruction is completed.

16. The device according to claim 9, wherein if the instruction execution processing apparatus is provided with a unit controlling an execution completion of an instruction in its instruction control unit, said control unit stores an ID assigned for each instruction, which is stored in the execution completion management unit, in an entry of the write reservation station unit.

17. The device according to claim 9, wherein if it is confirmed that a branch instruction corresponding to a valid entry of the write reservation station unit is neither executed nor completed due to an occurrence of interruption, the entry corresponding to the write reservation station unit is nullified.

18. The device according to claim 1, further comprising:
a bypass unit making branch history information, writing of which in said branch prediction unit is held, a research target of a branch prediction.

19. The device according to claim 9, further comprising:
a bypass unit making the branch history information of the branch instruction a research target of a branch prediction, wherein the branch instruction comprises the write reservation station unit.

20. The device according to claim 19, wherein said bypass unit makes the branch history information a search target of a branch prediction when a conditional code for the branch instruction is confirmed if it is confirmed that the branch instruction is not branched and when a branch destination address is confirmed if it is confirmed that the branch instruction is branched.

21. The device according to claim 1, wherein a dual-port RAM in which writing and reading can be simultaneously executed independently is used for said branch prediction unit to hold an entry.

22. A branch history information write control device in an instruction execution processing apparatus, comprising:
a memory unit storing an instruction string;
branch prediction unit performing a branch prediction of a branch instruction;
a control unit controlling the memory unit and the branch prediction unit in such a way that writing of branch history information in the branch prediction unit and control over fetching of the instruction string in the memory unit may not occur simultaneously; and
a write reservation station unit temporarily storing the branch history information to be written,
wherein if said branch prediction unit is configured to simultaneously write a plurality of entries and said write reservation station unit stores a plurality of valid information, writing of which is held, said control unit simultaneously writes the plurality of information in a timing such that writing in said branch prediction unit is possible.

23. For a branch history information write control device in an instruction which is resolved is taken or not and it is determined the branch destination address cannot be completed because of an in-flight preceding branch instruction(s), an execution processing apparatus, comprising:
a memory unit storing an instruction string;
branch prediction unit performing a branch prediction of a branch instruction; and
a control unit controlling the memory unit and the branch prediction unit in such a way that writing of branch history information in the branch prediction unit and control over fetching of the instruction string in the memory unit may not occur simultaneously, wherein if an instruction is conditionally encoded or branched by an execution completion of an execution instruction, which exits before a branch instruction, if there is another branch instruction before the branch instruction when a branch destination address is confirmed, and even if the branch instruction cannot be completed, said control unit writes the branch history information of the branch instruction in said branch prediction unit or registers the information in a write reservation station unit, wherein said control unit provides a flag indicating that the branch history information is written or registered in the write reservation station unit for each corresponding branch instruction being processed.

24. An instruction control method in an apparatus provided with both a memory storing an instruction string, and a branch prediction unit performing a branch prediction of a branch instruction, comprising:

controlling the memory unit and the branch prediction unit in such a way that writing of branch history information in said branch prediction unit and control over fetching of the instruction string in the memory do not occur simultaneously; and counting several clock cycles (several states) to delay, for a period of several clock cycles (several states), the writing of the branch history information and control, beforehand, the fetching of the instruction string.

25. The method according to claim 24, wherein the branch history information is written in said branch prediction unit in a timing such that said memory cannot accept an instruction fetch request.

26. The method according to claim 24, wherein the branch history information is written in said branch prediction unit in a timing of requesting a pre-fetch of an instruction.

27. The method according to claim 24, wherein if the branch history information of a branch instruction which has failed in a branch prediction is written in said branch prediction unit, the branch history information is written in said branch prediction unit after several clock cycles (several states).

28. The method according to claim 24, wherein if the branch history information of a branch instruction which has failed in a branch prediction is written in said branch prediction unit, the branch history information is written in said branch prediction unit after a re-instruction fetch request by the branch instruction is executed and several clock cycles (several states) after the re-instruction fetch request is executed.

29. The method according to claim 24, further comprising:

temporary instruction buffer operation temporarily storing an instruction string, outputted by said memory, wherein if there is no instruction string to be stored in the temporary instruction buffer operation and there is no instruction fetch request, the branch history information of a branch instruction to be requested to be written is written in said branch prediction unit several clock cycles (several states) after a write request is issued.

30. The method according to claim 24, further comprising:

temporary instruction buffer operation temporarily storing an instruction string, outputted by said memory, wherein if there is no instruction string to be stored in the temporary instruction buffer operation and there is no instruction fetch request, the branch history information of a branch instruction to be requested to be written is not promptly written in said branch prediction unit, waits for a next instruction fetch request and is written several clock cycles (several states) after the instruction fetch request is executed.

31. The method according to claim 24, wherein when the branch history information of a branch instruction which has failed in a branch prediction is written in said branch prediction unit, the branch history information is written after its instruction decoding unit or a temporary instruction buffer receives a fetch instruction string corresponding to a re-instruction fetch requested by the branch instruction.

32. The method according to claim 24, further comprising:

write reservation station operation temporarily storing the branch history information to be written.

33. The method according to claim 32, wherein only the branch history information concerning a branch instruction which must be written in said branch prediction unit is registered in said write reservation station operation.

34. The method according to claim 33, wherein the branch history information is a new entry registration, an entry content change or an entry erasure.

35. The method according to claim 32, wherein if a storage capacity in the write reservation station operation is full and further there is a register request on a branch instruction, branch history information of which must be written in the write reservation station operation, at least one group of a branch history information, writing of which is held in the write reservation station operation and the branch history information which has been requested to be registered, is written.

36. The method according to claim 24, wherein if a branch instruction which is resolved is taken or not and it is determined the branch destination address cannot be completed because of an in-flight preceding branch instruction(s), the branch history information of the branch instruction is written in said branch prediction unit or registered in the reservation station operation.

37. The method according to claim 32, wherein branch history information, writing of which is held in said write reservation station operation, is written when an execution of an instruction is completed.

38. The method according to claim 32, wherein branch history information of a corresponding entry is written in said write reservation station unit when execution of an instruction is completed.

39. The method according to claim 32, wherein an instruction control unit further comprises the operation of managing an execution completion of an instruction, and stores an ID assigned for each instruction which is stored in said execution completion management operation, in an entry in said write reservation station operation.

40. The method according to claim 32, wherein if it is found that a branch instruction corresponding to a valid entry stored in said write reservation station operation due to an occurrence of interruption, is not executed and completed, a corresponding entry stored in said write reservation station operation is nullified.

41. The method according to claim 24, wherein branch history information, writing of which in said branch prediction unit is held, is a search target of a branch prediction.

42. The method according to claim 32, wherein branch history information of a branch instruction which is being executed in said write reservation station operation, is a search target of a branch prediction.

43. The method according to claim 42, wherein the branch history information is a search target of a branch prediction when a conditional code for the branch instruction is confirmed if it is confirmed that the branch instruction is not branched, and when a branch destination address is confirmed if it is confirmed that the branch instruction is branched.

44. An instruction control method in an apparatus provided with both a memory storing an instruction string, and a branch prediction unit performing a branch prediction of a branch instruction, comprising:
- controlling the memory unit and the branch prediction unit in such a way that writing of branch history information in said branch prediction unit and control over fetching of the instruction string in the memory do not occur simultaneously; and
- a write reservation station operation temporarily storing the branch history information to be written,
- wherein if said branch prediction unit is configured to simultaneously write a plurality of entries and the write reservation station unit stores a plurality of valid information, writing of which is held, a plurality of writing executions are performed in a timing such that writing in said branch prediction unit is available.

45. An instruction control method in an apparatus wherein if a branch instruction which is resolved is taken or not and it is determined the branch destination address cannot be completed because of an in-flight preceding branch instruction(s), provided with both a memory storing an instruction string, and a branch prediction unit performing a branch prediction of a branch instruction, comprising:
- controlling the memory unit and the branch prediction unit in such a way that writing of branch history information in said branch prediction unit and control over fetching of the instruction string in the memory do not occur simultaneously,
- wherein if an instruction is conditionally encoded or branched by an execution completion of an execution instruction, which exists before a branch instruction, if there is another branch instruction before the branch instruction when a branch destination address is confirmed and if the branch instruction cannot be completed, the branch history information of the branch instruction is written in said branch prediction unit or registered in a reservation station operation,
- wherein a flag indicating that the branch history information is written or registered in said write reservation station operation is provided for each corresponding branch instruction being processed.

* * * * *

UNITED STATES PATENT AND TRADEMARK OFFICE
CERTIFICATE OF CORRECTION

PATENT NO.    : 6,920,549 B1
DATED         : July 19, 2005
INVENTOR(S)   : Masaki Ukai It is certified that error appears in the above-identified patent and that said Letters Patent is hereby corrected as shown below:

<u>Column 17,</u>
Line 40, change "claim 9" to -- claim 10 --.

<u>Column 18,</u>
Line 55, delete "information write control device in an" after "history".

<u>Column 19,</u>
Line 6, delete "even" after "and".

Signed and Sealed this

Second Day of May, 2006

JON W. DUDAS
*Director of the United States Patent and Trademark Office*